(12) United States Patent
Somlai-Fischer et al.

(10) Patent No.: US 11,893,541 B2
(45) Date of Patent: Feb. 6, 2024

(54) MEETING AND COLLABORATIVE CANVAS WITH IMAGE POINTER

(71) Applicant: Prezi, Inc., San Francisco, CA (US)

(72) Inventors: Adam Somlai-Fischer, Budapest (HU); Zsuzsa Weiner, Budapest (HU); Dániel Varga, Budapest (HU)

(73) Assignee: Prezi, Inc., Concord, CA (US)

( * ) Notice: Subject to any disclaimer, the term of this patent is extended or adjusted under 35 U.S.C. 154(b) by 0 days.

(21) Appl. No.: 17/501,659

(22) Filed: Oct. 14, 2021

(65) Prior Publication Data
US 2022/0122037 A1    Apr. 21, 2022

Related U.S. Application Data

(60) Provisional application No. 63/091,962, filed on Oct. 15, 2020.

(51) Int. Cl.
*G06Q 10/101*    (2023.01)
*H04L 12/18*    (2006.01)
*G06F 3/04812*    (2022.01)
*G06F 3/04845*    (2022.01)

(52) U.S. Cl.
CPC ....... *G06Q 10/101* (2013.01); *G06F 3/04812* (2013.01); *G06F 3/04845* (2013.01); *H04L 12/1822* (2013.01)

(58) Field of Classification Search
CPC .............. G06Q 10/101; G06F 3/04812; G06F 3/04845; H04L 12/1822
See application file for complete search history.

(56) References Cited

U.S. PATENT DOCUMENTS

| | | | | |
|---|---|---|---|---|
| 5,107,443 A | * | 4/1992 | Smith | G06Q 10/10 715/803 |
| 6,157,367 A | * | 12/2000 | Van Der Haar | G06F 3/0486 715/856 |
| 6,392,675 B1 | * | 5/2002 | Becker | G06F 3/04812 715/858 |
| 9,377,865 B2 | * | 6/2016 | Berenson | G06F 3/017 |
| 9,832,237 B2 | * | 11/2017 | Lock | H04L 65/403 |
| 2003/0043200 A1 | * | 3/2003 | Faieta | G06F 16/9577 707/E17.121 |

(Continued)

*Primary Examiner* — Andrew T Chiusano
(74) *Attorney, Agent, or Firm* — Schwegman, Lundberg & Woessner, P.A.

(57) ABSTRACT

Example embodiments are directed to providing a zoomable meeting and collaborative canvas with image pointers. In example embodiments, a video management system establishes a zoomable meeting by communicatively coupling a plurality of user devices. A live audio/video feed is received from one or more users of the plurality of user devices. The system causes display of the zoomable meeting on a display of each of the plurality of user devices by displaying a zoomable canvas that enables movement of one or more image pointers that each show the live audio-video feed of one of the one or more users. The system monitors for an image pointer operation for one of the image pointers, whereby the image pointer operation comprises a navigation command or a zoom command. Based on the image pointer operation, the system causes an update to the zoomable canvas to display performance of the image pointer operation.

20 Claims, 17 Drawing Sheets

(56) References Cited

U.S. PATENT DOCUMENTS

| | | | |
|---|---|---|---|
| 2009/0284532 A1* | 11/2009 | Kerr | G06F 3/0481 |
| | | | 345/442 |
| 2012/0317501 A1* | 12/2012 | Milou | G06Q 10/101 |
| | | | 715/753 |
| 2012/0327104 A1* | 12/2012 | Schrauben | G01C 23/00 |
| | | | 345/619 |
| 2013/0198653 A1* | 8/2013 | Tse | G06F 3/0484 |
| | | | 715/751 |
| 2014/0164934 A1* | 6/2014 | Yang | G06Q 50/01 |
| | | | 715/738 |
| 2015/0279071 A1* | 10/2015 | Xin | G06T 9/40 |
| | | | 345/440 |
| 2019/0004639 A1* | 1/2019 | Faulkner | G06F 3/048 |
| 2021/0185105 A1* | 6/2021 | Van Wie | H04L 12/00 |

* cited by examiner

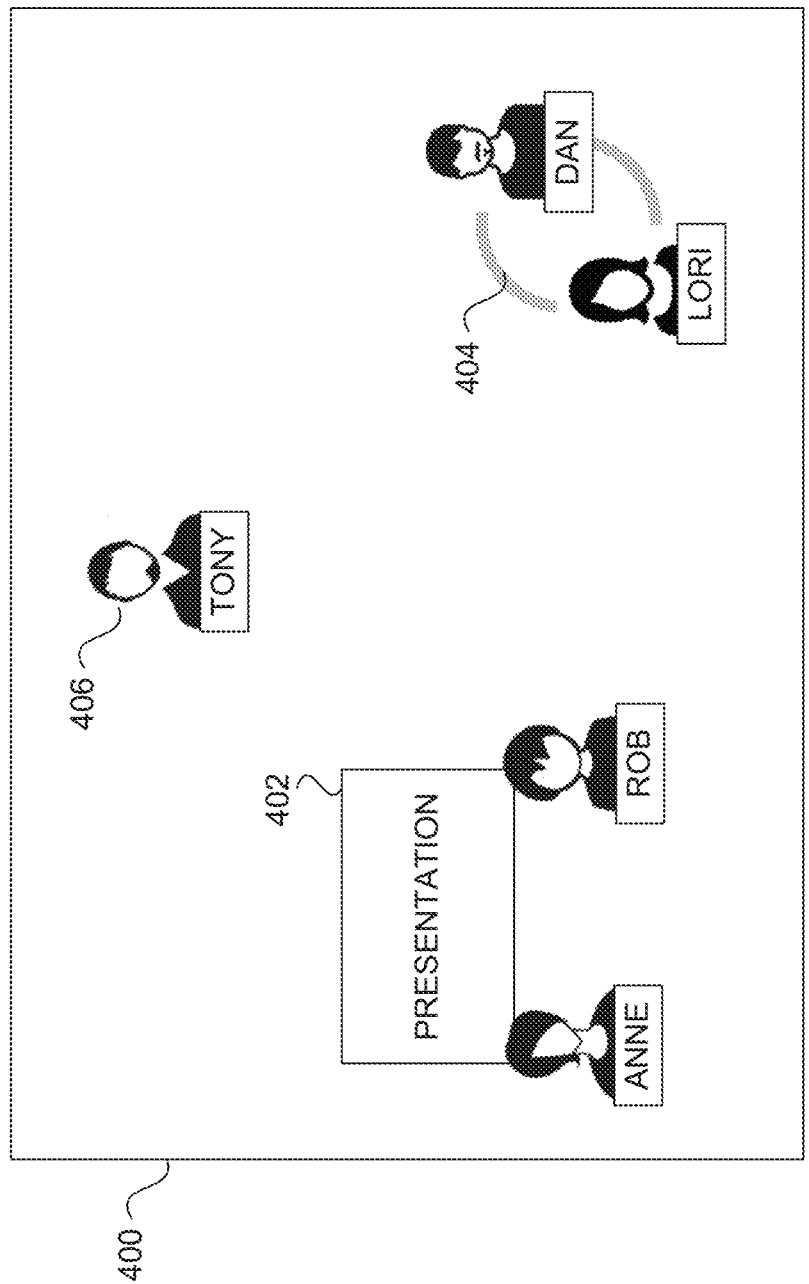

MEETING AND COLLABORATIVE CANVAS WITH IMAGE POINTER

RELATED APPLICATIONS

This application is related to and hereby claims the priority benefit of U.S. Provisional Patent Application No. 63/091,962 filed Oct. 15, 2020, titled "Meeting and Collaborative Canvas with Image Pointer," which is incorporated herein by reference in its entirety.

TECHNICAL FIELD

The subject matter disclosed herein generally relates to special-purpose machines configured for causing display of a video conference user interface, and to technologies by which such special-purpose machines become improved compared to other machines that cause display of a video conference user interface. Specifically, the present disclosure addresses systems and methods that provide a zoomable canvas (e.g., a graphical workspace) for conducting meetings and collaborative sessions that utilize image pointers.

BACKGROUND

Conventionally, video conference user interfaces provide a grid structure whereby an image of each participant is displayed in a cell or portion of a grid. Some conventional systems allow a host to divide a video conference into smaller groups (e.g., breakout rooms) where group members can interact. However, the participants generally cannot control which smaller group they join or move freely between such groups. Further still, conventional conference systems generally provide a two-dimensional environment in which the meetings take place. This may cause some participants to be less engaged in the meeting.

BRIEF DESCRIPTION OF THE DRAWINGS

Some embodiments are illustrated by way of example and not limitation in the figures of the accompanying drawings.

FIGS. 4A-4C illustrate a meeting using the zoomable canvas and image pointers, according to alternative example embodiments.

DETAILED DESCRIPTION

Figure 1:
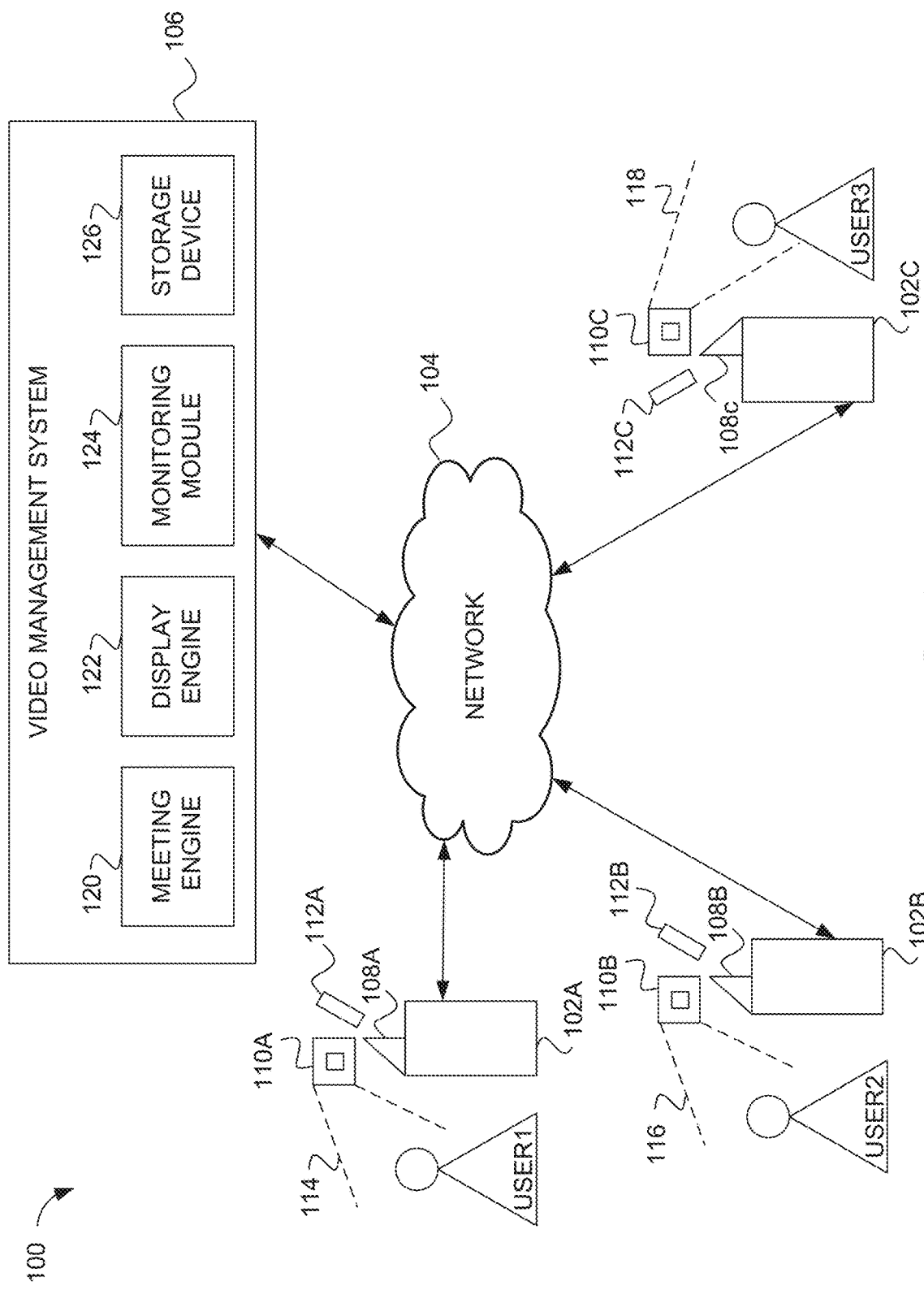
FIG. 1 is a diagram illustrating a network environment suitable for providing a meeting and collaborative session on a zoomable canvas that uses one or more image pointers, according to some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

A zooming user interface (ZUI) is a type of graphical user interface (GUI) in which a scale of a viewed area is changed in order to view more or less details and to browse through and among different visual display elements. As used herein, the term "display element" refers to a computer-generated image that is displayed on a portion of a canvas visible on a display screen in the course of a zooming meeting or collaborative session and that, therefore, constitutes a part of the meeting or collaborative session. The display element may include text, image, graphics, shapes, video, animation, hypertext links, other (nested) display elements, or other visual components, for example.

Display elements may be added to, removed from, or edited on a graphical workspace referred to as a "canvas" to create the zoomable meeting or whiteboard (e.g., collaborative user interface used in a collaborative session) in which details can be presented through zooming in and out to reveal more or less details, respectively. As used herein the term "canvas" refers to an abstract space with its own coordinate system on which visual content is presented. The coordinate system of the canvas comprises two dimensions, and the display elements are displayed at (x,y) coordinate locations designated by a user during editing or creation of the meeting. In some embodiments, the coordinate system is referred to as having 2.5 dimensions due to zooming capability. At any given time, only a portion of the canvas is visible. A user may view portions of the canvas through a "window." The use of the canvas and the viewing window allows for non-linear presentations, an option to present richer content details, and to give a better overview and understanding of complex visual messages and relationships. While viewing the canvas through the viewing window, users can pan across the canvas in two dimensions and zoom into objects of interest (e.g., display elements). For example, as the user zooms into a text object, it may be represented as a small dot, then a thumbnail of a page of text, then a full-sized page, and finally, a magnified view of the page.

The ZUI differs from a normal canvas in that the user may zoom in or out from a display element. Display elements can be inserted anywhere among the meeting or collaboration session. Users can navigate (e.g., pan across) the canvas in two dimensions (in 2D) and zoom into objects of interest (and/or zoom out). Display elements presented inside a zoomed-in region can, in turn, be zoomed-in themselves to reveal even further additional details, allowing for recursive nesting and an arbitrary level of zoom. For example, as a user zooms into a text object, the text may be represented initially as a small dot, then as a thumbnail image, next as a complete page, and finally as a magnified view of a portion of the canvas focused on a key passage from the text. After zooming in to view a display element, a user may zoom out and pan across the canvas and zoom in to a different display element. Thus, ZUIs use zooming as the primary metaphor for browsing through multivariate or hyperlinked information, for example.

Example embodiments enable the use of image pointers that allow a corresponding user to control viewing aspects of a zoomable meeting or collaborative session. In accordance with some embodiments, the user can control display elements viewable by the user by scrolling, zooming, and moving a live audio/video feed of themselves around on the zoomable canvas. As such, the live audio/video feed is referred to as the "image pointer." In some embodiments, a presenter may use their image pointer as a pointing device by moving to or zooming in on a portion of content that the presenter wants his viewers to focus on. Thus, the image pointer allows the presenter to "point" or focus on content on the zoomable canvas while also allowing the presenter to engage with (e.g., speak to, maintain eye contact with) the viewers. In other embodiments, the image pointer can be used by a device user to navigate themselves around the zoomable canvas. For example, the user can more their image pointer from a presentation to a private conversation area on the zoomable canvas to disengage from the presentation and enter a private conversation with other users, each having their respective image pointer in the private conversation area. The user can also zoom into display elements, using their image pointer to view more detailed information or collaboratively discuss/edit a workspace (e.g., whiteboard or collaborative project).

FIG. 1 is a diagram illustrating a network environment 100 suitable for providing a meeting and collaborative session on a zoomable canvas that uses one or more image pointers, according to some example embodiments. The network environment 100 includes a first user device 102*a*, a second user device 102*b*, and a third user device 102*c* (referred to generally as "user device 102") communicatively coupled over a network 104 to a video management system 106 to conduct a meeting or collaborative session (e.g., a whiteboarding session). The first user device 102*a* comprises a display screen 108*a*, a first camera 110*a* to capture motion picture images (also referred to as "video image"), and a first microphone 112*a* to capture sounds of a first physical scene 114 that includes a first user (user1) during a meeting or collaborative session. Similar, the second user device 102*b* comprises a display screen 108*b*, a second camera 110*b* to capture motion picture images, and a second microphone 112*b* to capture sounds of a second physical scene 116 that includes a second user (user2) during the meeting or collaborative session. The third user device 102*c* comprises a display screen 108*c*, a third camera 110*c* to capture motion picture images, and a third microphone 112*c* to capture sounds of a third physical scene 118 that includes a third user (user3) during the meeting or collaborative session.

The video management system 106 is a centralized service that manages the meeting or collaborative session for communicatively coupled user devices 102. Accordingly, the video management system 106 comprises components (e.g., hardware, engines, modules, storage devices) that enable the various operations that will be discussed in more detail below. In one embodiment, the video management system 106 comprises a meeting engine 120, a display engine 122, a monitoring module 124, and a storage device 126. The video management system 106 may comprise other components used to provide meeting operations that are not discussed in detail herein.

The meeting engine 120 is configured to establish and conduct a zoomable meeting (or collaborative session). In example embodiments, the meeting engine 120 communicatively couples the user devices 102, via the network 104, to establish the zoomable meeting. In some cases, the user devices 102 have an invitation to join the zoomable meeting that includes an identifier for the zoomable meeting and possibly a password to join. Based on a verification of the identifier and optional password, the corresponding user device 102 is joined into the zoomable meeting. The meeting engine 120 also receives the captured video images and sounds (e.g., live audio/video feed) from each user device 102. The live audio/video feed is then provided to the display engine 122.

The display engine 122 is configured to cause display of the zoomable canvas of the meeting or collaborative session. The display of the zoomable canvas includes the display of display elements and image pointers corresponding to each user of the user devices 102. As such, the display engine 122 receives the live audio/video feed, crops the feed around an area of each user's face, and generates an image pointer with the cropped facial image. The image pointer is then positioned on the zoomable canvas based, in part, on a cursor (position) indication from the corresponding user. The zoomable canvas can also include a portion of each live audio/video feed from each user device 102. For example, the live audio/video feed may be displayed, by the display engine 122, as part of a presentation. Alternatively, a portion of the live audio/video feed (e.g., a facial portion) can be shown within an image pointer. The display engine 122 also causes display of presentation content (e.g., a slideshow, videos, live speakers).

The monitoring module 124 is configured to monitor for meeting events. The meeting events can comprise, for example, movement of image pointers, sharing of information (e.g., sharing screens), and zoom-in and zoom-out operations. Detection of an image pointer navigation command (to move the image pointer from one location to another) or a zoom command (to zoom in or zoom out) by the monitoring module 124 will trigger an update to the zoomable canvas by the display engine 122 to display the corresponding operation indicated by the command (e.g., the monitoring module 124 provides instructions to the display engine 122 to perform the operation).

The storage device 126 is configured to store meeting information at the video management system 106. For example, the meeting information can comprise a meeting identifier for a meeting along with identifiers of users that have accepted an invitation to attend the meeting. The storage device 126 can also store a copy of a client application that is provided to the user devices 102 to enable the user devices 102 to participate in the zoomable meeting.

In accordance with some embodiments, the user devices 102 may include user interface gesture sensors (e.g., a part of the camera 110) responsive to user gestures, such as hand gestures, that may act as a device interface to move their image pointer so as to trigger a all panning and/or zooming transition to bring a different display element into a focus as a center of attention. Alternatively, the user can use a pointing device (e.g., mouse) to control their image pointer to cause a pan or zoom on the canvas.

In various embodiments, one or more portions of the network 104 may be an ad hoc network an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a Wi-Fi network, a WiMax network, a satellite network, a cable network, a broadcast network, another type of network, or a combination of two or more such networks. Image information, ZUI information, instructions to move the image pointer, and other information used to conduct the meeting or collaborative session may be transmitted and received by the user devices 102 and the video management system 106 over the network 104 using a transmission medium via a network interface device (e.g., a network interface component included in the communication components) and utilizing any one of a number of well-known transfer protocols (e.g., HTTP). Any one or more portions of the network 104 may communicate information via a transmission or signal medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In some embodiments, the user devices 102 interact with the network 104 and the video management system 106 through a client application stored thereon or through a browser. The client application of the user devices 102 allow for exchange of information with and over the network 104. The client application or browser may also cause presentation of the zoomable canvas and manipulation of image pointers on the zoomable canvas. For example, the client application or browser running on the first user device 102a may provide instructions to move the image pointer from one location to another on the canvas or to zoom into or out of a portion of the canvas, which may be displayed to the second user device 102b and the third user device 102c.

In example embodiments, any of the user devices 102 and the video management system 106 shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein. For example, a special-purpose computer system able to implement any one or more of the methodologies described herein is discussed below with respect to FIG. 8, and such a special-purpose computer may be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines. Furthermore, any number of user devices 102 may be located in the network environment 100 and participate in the meeting or collaborative session.

Figure 2:
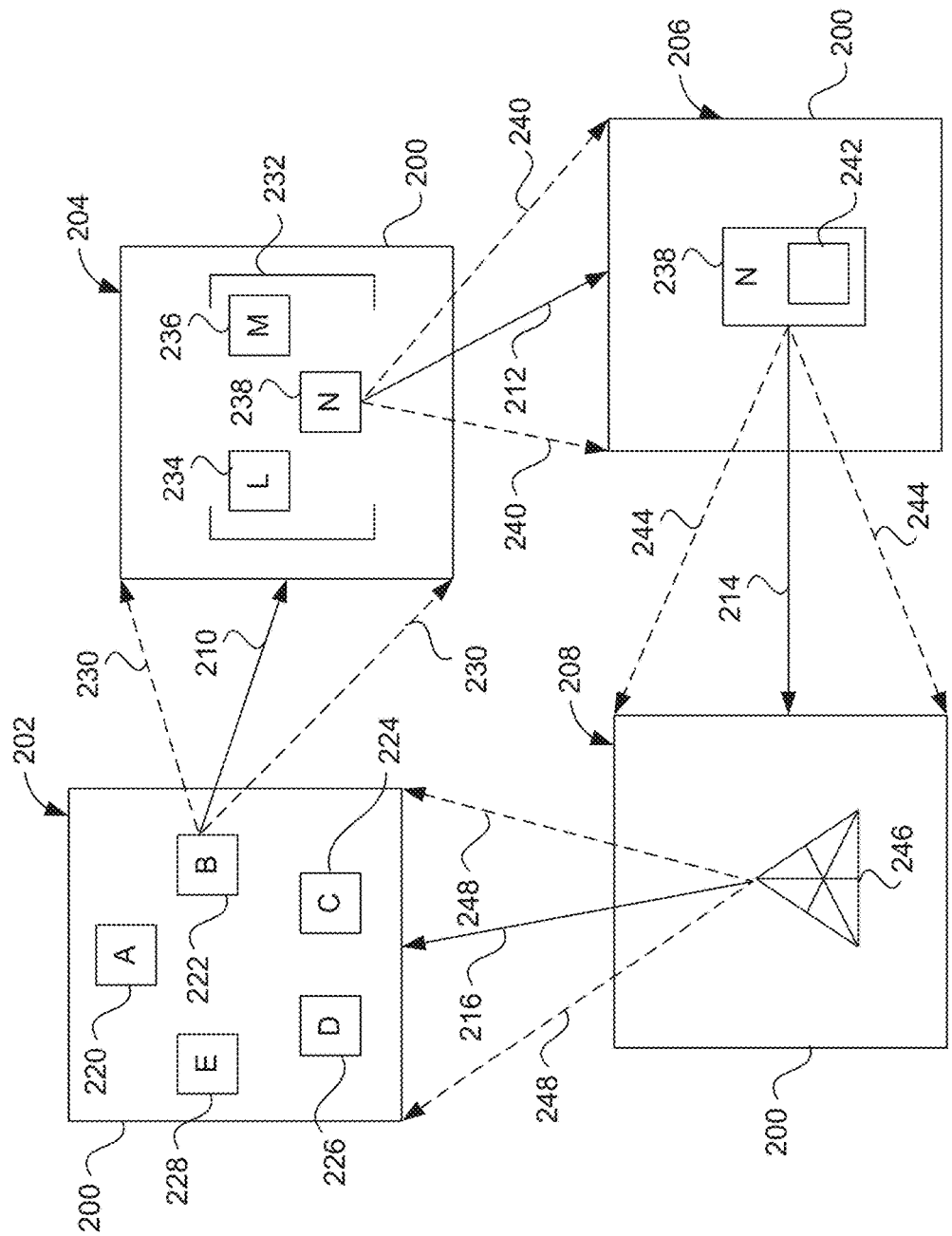
FIG. 2 shows an illustrative sequence of images produced on a display screen during an example meeting or presentation utilizing zoom functions of the zoomable canvas, according to some example embodiments.

FIG. 2 shows an illustrative sequence of images presented on a display screen of the user device 102 during an example meeting or presentation (collectively referred to herein as "meeting") or collaborative session utilizing the zoomable canvas, according to some example embodiments. A meeting or collaborative session created using the ZUI environment may be encoded in computer-readable code stored in a computer-storage device and can be used to configure a computer system or the user device 102 to show the meeting or collaborative session on the display screen. The meeting or collaborative session is created by including a plurality of display elements on a canvas 200 and defining attributes for individual display elements or groups of display elements such as their size, orientation, location, zoom level, and/or order of presentation.

In FIG. 2, the example meeting includes a sequence of screen images 202-208 showing display elements produced on a display screen. More particularly, the example meeting follows a sequence of path segments 210-216 in which the first three path segments 210-214 involve transitions to successively more zoomed-in views of display elements on the canvas 200, and in which the fourth path segment 216 involves a transition to a more zoomed-out view of the canvas 200. It will be appreciated that path segments represent computer code data structures encoded in a storage device that indicate an order of transitions among views in the meeting shown on the display screen, but the path segments 210-216 are not visible in the actual meeting.

The example meeting first generates screen image 202 in which display elements 220-228 are visible. As indicated by dashed lines 230, the meeting next presents a second screen image 204 that zooms in to focus on the display element 222, which in this example, is associated with a frame 232 (which may not be visible during the meeting) that groups together additional display elements 234-238. It will be appreciated that the frame 232 acts as a point of focus for zooming during the meeting.

As indicated by dashed lines 240, the meeting next presents a third screen image 206 that zooms in to focus on the display element 238. The zoomed-in view of the display element 238 includes detail region 242 that was too small to be visible in the screen images 202 and 204.

As indicated by dashed lines 244, the meeting next presents a fourth screen image 208 that zooms in to focus in and show more detail and/or increased size of a region of the display element 238 having a detailed display element 246. Subsequently, as indicated by dashed lines 248, the meeting next zooms out to focus again on the first screen image 202. Thus, the illustrative meeting moves from the screen images 202 to 208 to zoom into the canvas 200 and focus on progressively more details of selected display elements, and then zooms back out again from the screen image 208 to screen image 202.

For illustrative purposes, FIGS. 3A-3E illustrate a meeting using a zoomable canvas and an image pointer, according to some example embodiments. The meeting in the embodiment of FIGS. 3A- 3E is conducted using some of the sequence of screen images 202-208 of FIG. 2. The meeting includes the use of an image pointer 300 of one of the users (e.g., a presenter) attending the meeting. Here, the image pointer 300 comprises an image of the presenter. In example embodiments, the image pointer 300 is a live image (e.g., live audio/video feed) captured by the camera 110. Thus, the presenter can be talking and gesturing in the image pointer 300. By using the image pointer 300, the presenter can be presenting information while moving around the canvas 200. Since a viewer's eyes/gaze is typically attracted to the face/image of the presenter on the canvas 200, the presenter can move the image pointer 300 to an object or display element (e.g., hover over or be in proximity to) while describing the object or display element. Thus, the image pointer 300 is a useful way to replace a mouse cursor when sharing a screen during a meeting.

Figure 3A:
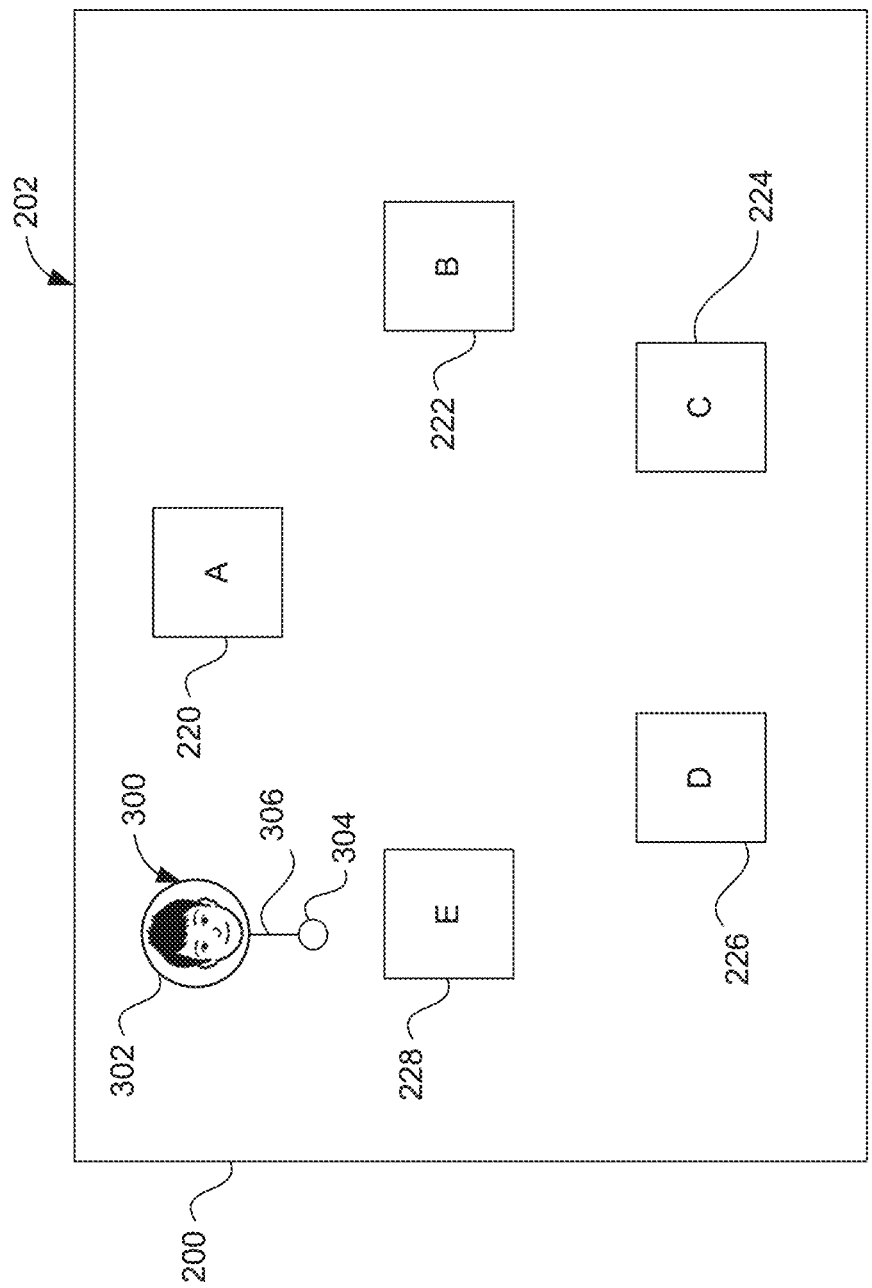
FIGS. 3A-3E illustrate a meeting using the zoomable canvas and the image pointer, according to some example embodiments.

Referring to FIG. 3A, the meeting starts on the first screen image 202 in which the display elements 220-228 are visible. The image pointer 300 of the presenter is shown on the first screen image 202. The image pointer 300 comprises an image portion 302 and a coupled ring 304. In some embodiments, the presenter drags the ring 304 with a cursor device (e.g., mouse) to move the image portion 302 that is coupled to the ring 304 via an arm 306. Alternative embodiments of the image pointer 300 may only comprise the image portion 302, and the user may move the image pointer 300 by drag the image portion 302.

Figure 3B:
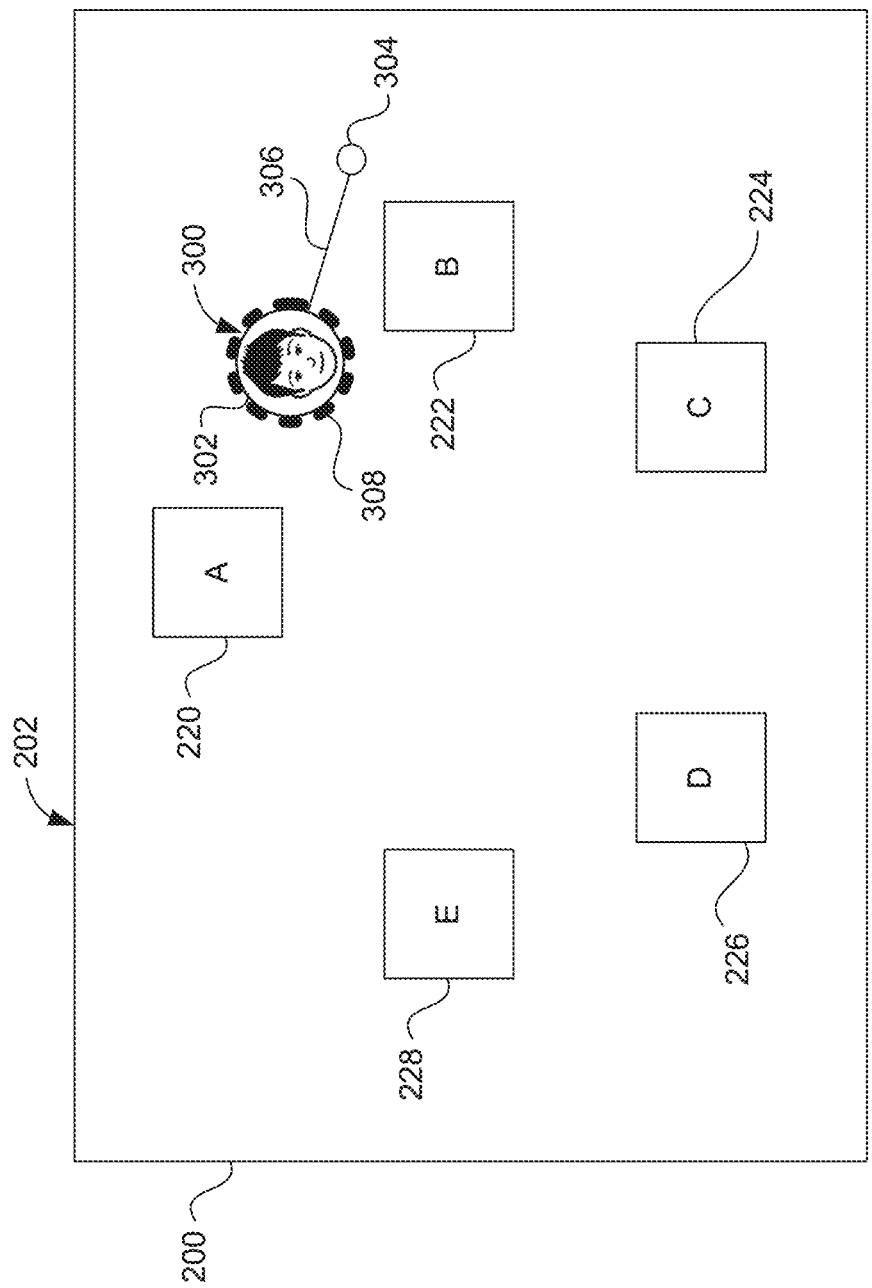

Referring now to FIG. 3B, the image pointer 300 is being dragged towards the display element 222. The arm 306 coupling the image portion 302 and the ring 304 is shown to be elastic in that it stretches to become longer as the presenter accelerates moving the ring 304 around the canvas 200 dragging the image portion 302 behind it towards the display element 222. Subsequently, the arm 306 returns to a shorter length when the ring 304 arrives at the object or display element to which the presenter wants to point.

In some embodiments, the movement of the image pointer 300 may also cause the image portion 302 to provide dynamically radiating elements 308 about the image portion 302. The dynamically radiating elements 308 may be provided to further indicate that the image pointer 300 is moving and/or to help the image pointer 300 stand out on the canvas 200. Alternative embodiments may not include the use of the radiating elements 308.

Figure 3C:
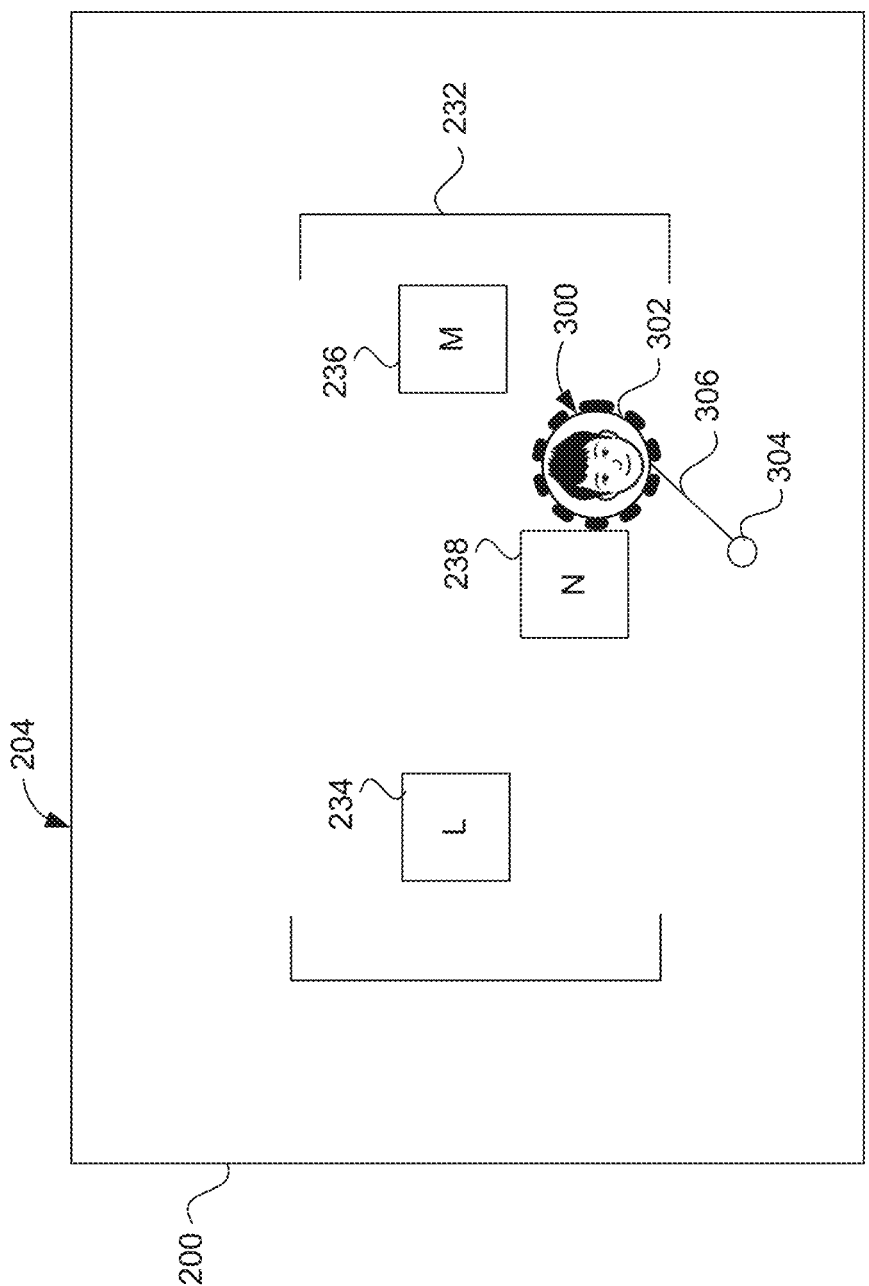

The image pointer 300 can be used in conjunction with ZUI functions. As such, FIG. 3C illustrates a zoom in from the first screen image 202 to the second screen image 204 that zooms in to focus on the display element 222 which is associated with the frame 232. As shown, the image pointer 300 is being dragged towards the display element 238 within the frame 232. The arm 306 coupling the image portion 302 and the ring 304 is shown stretched as the presenter moves the ring 304 dragging the image portion 302 behind it towards the display element 238.

Figure 3D:
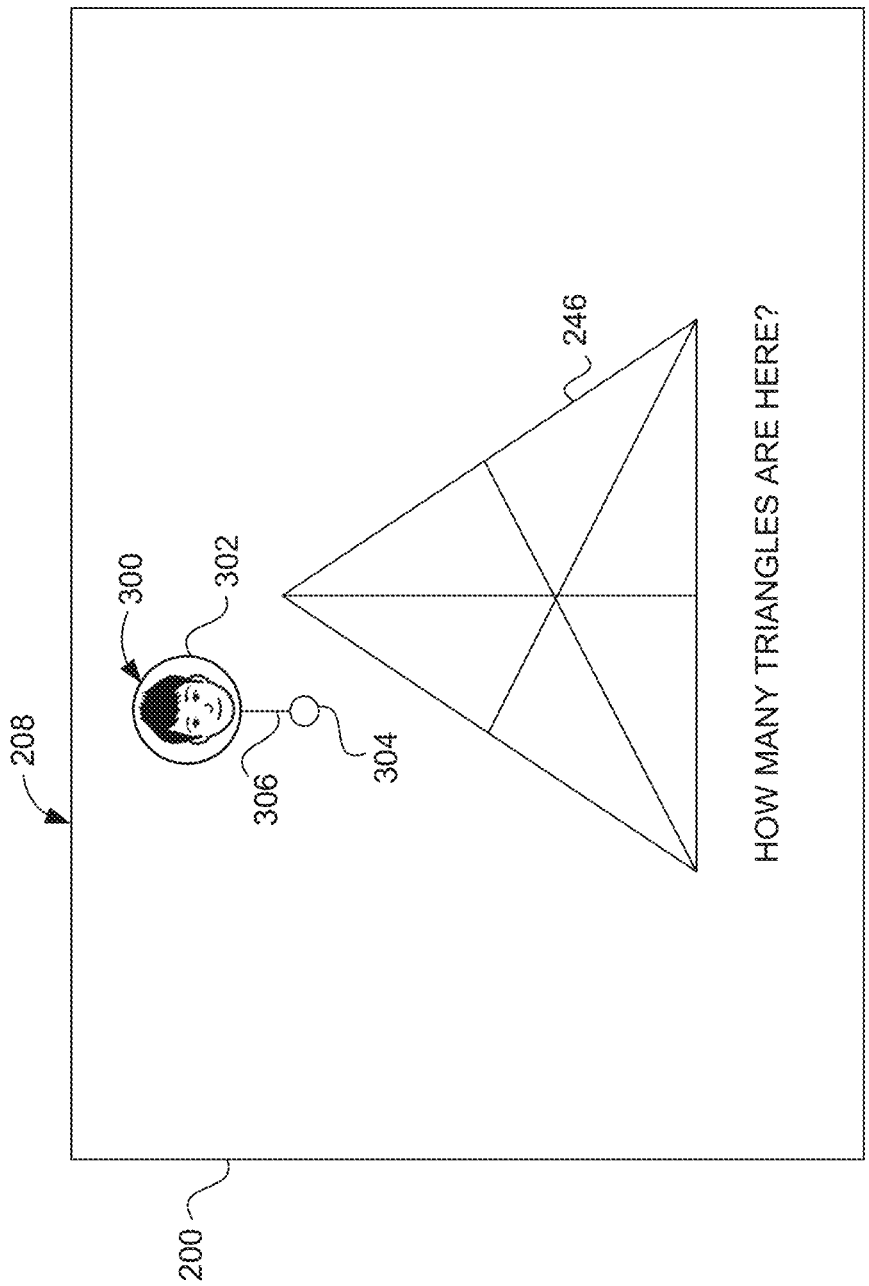

The presenter further zooms into the fourth screen image 208 (via the third screen image 206) in FIG. 3D. The presenter has stopped moving the image pointer 300 as evident by the absence of the radiating elements 308 and the return of the arm 306 to its shortened state. Here, the presenter may be providing an explanation of the detailed display element 246.

Figure 3E:
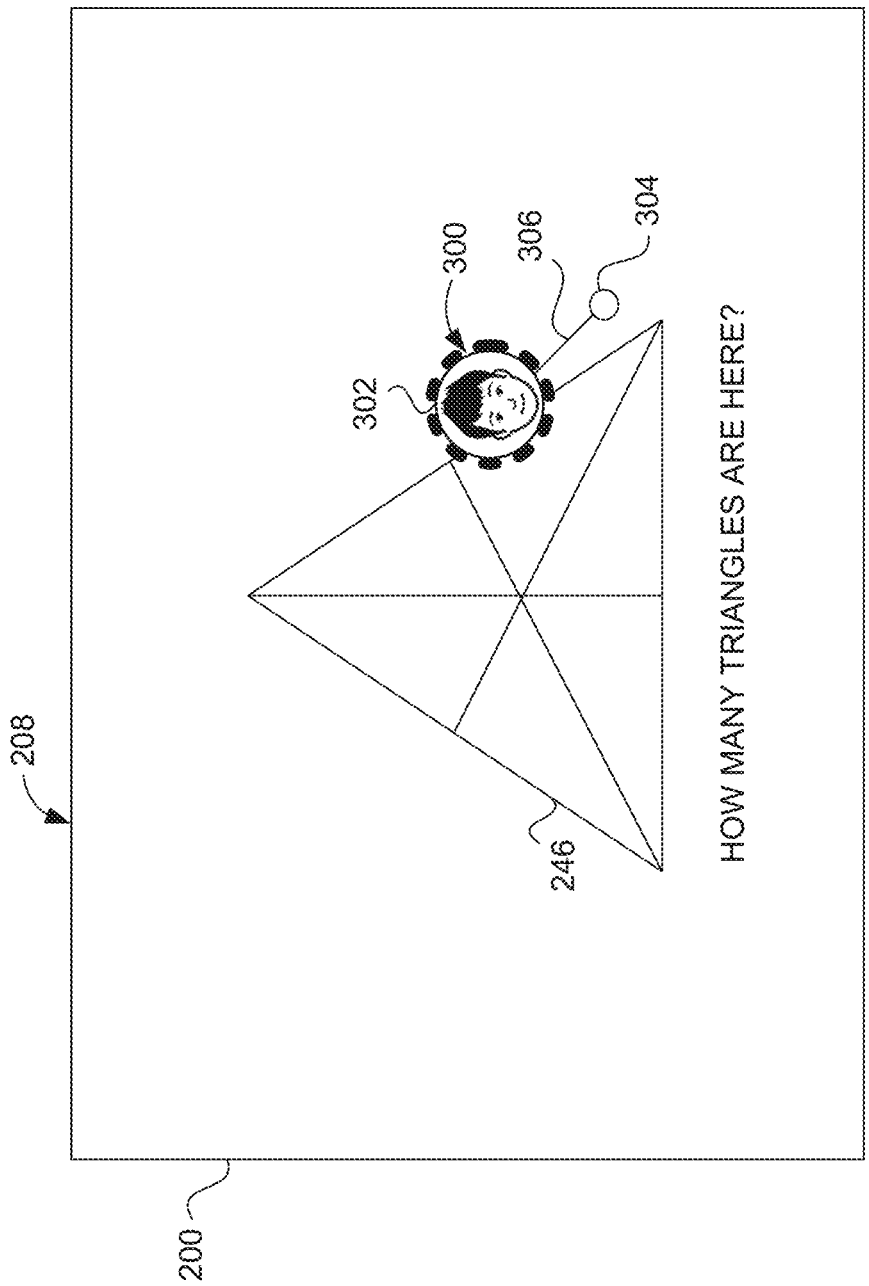

As the presenter discusses the detailed display element 246, the presenter can move the image pointer 300 to a portion of the detailed display element 246 that the presenter is talking about. As shown in FIG. 3E, the presenter has moved the image pointer 300 to a right side of the detailed display element 246 as the presenter discusses that portion of the detailed display element 246. The presenter can continue to move about the detailed display element 246 to explain various portions of the detailed display element 246. The presenter can also zoom out of the fourth screen image 208 to discuss other elements in the first screen image 202, the second screen image 204, or the third screen image 206.

Figure 4B:
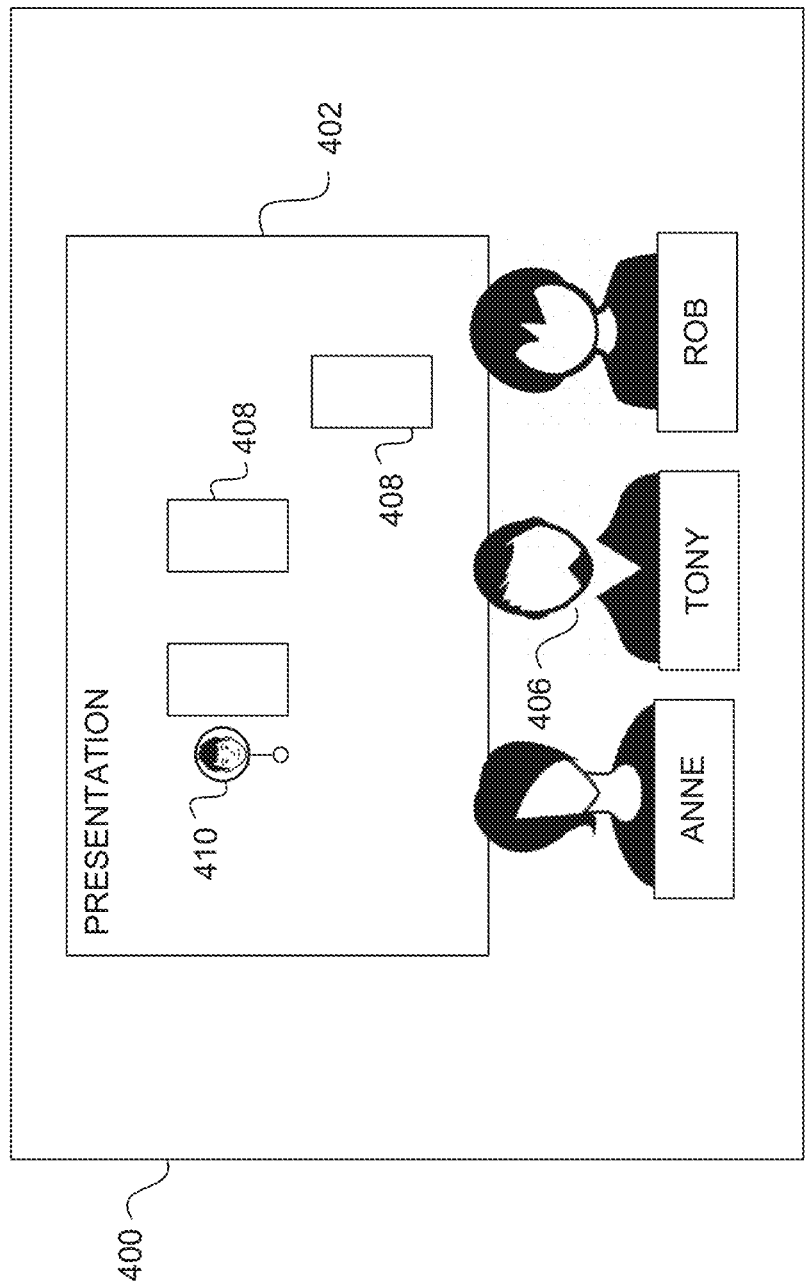
Figure 4C:
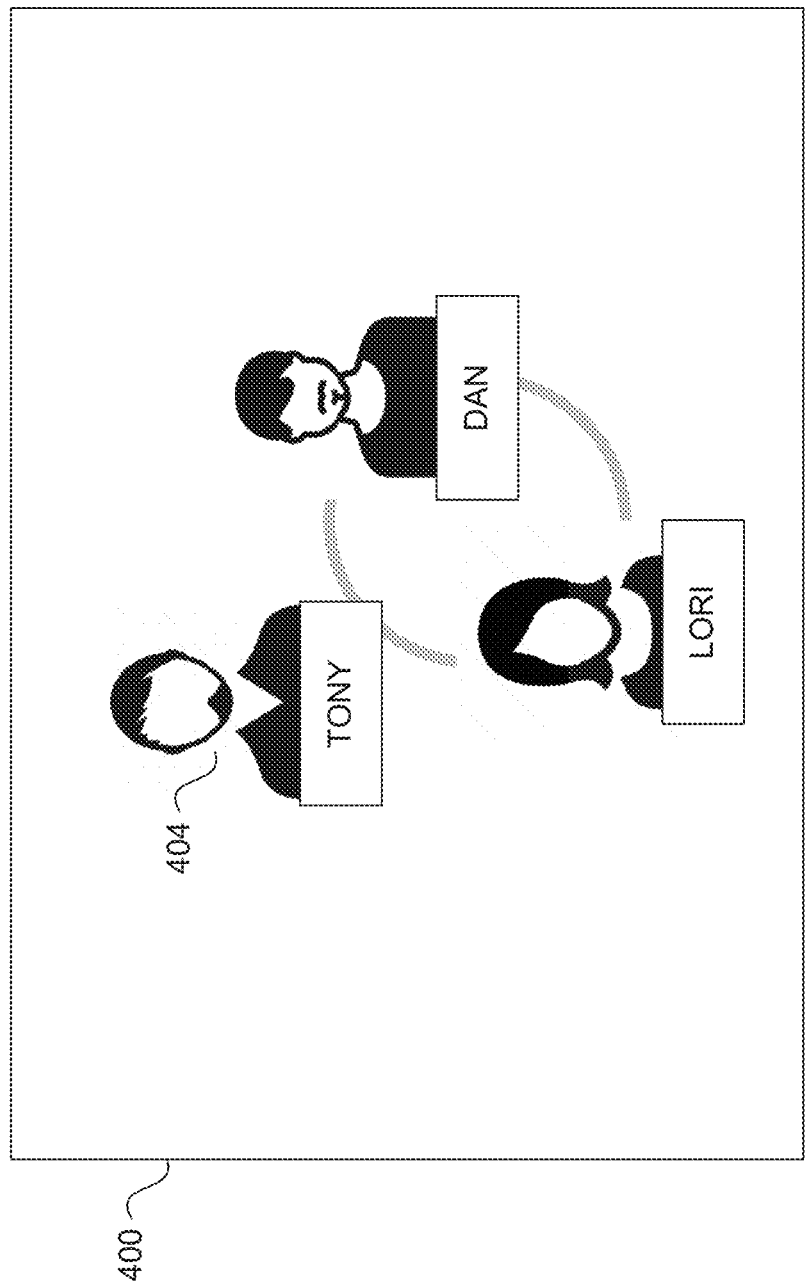

FIGS. 4A-4C illustrate a meeting using a zoomable canvas and image pointers, according to some example embodiments. The meeting in this embodiment differs from a conventional video meeting where users are typically arranged in a grid and all share the same meeting experience. For example, a sub-set of the users typically cannot carry on a private conversation during the meeting. While conventional video meetings may allow users to be grouped into smaller breakout sessions, these breakout sessions are typically controlled by a meeting host. Thus, the users are not free to move between a real-time meeting and private conversations or breakout sessions.

The embodiment of FIG. 4A-4C is conducted on a zoomable canvas 400 that provides ZUI functions. Referring to FIG. 4A, a meeting is in session that includes a video conference or presentation 402. A video image of each person in attendance is placed on the canvas 400. These video images are each an image pointer in that each user respectively depicted by a video image can control where they want to be located on the canvas 400. That is, each user can control their own image pointer to move around the canvas 400 and move between the presentation 402 and other activities occurring on the canvas 400. As shown, Anne and Rob are attending the video presentation 402 where they are viewing the same shared experience. In contrast, Lori and Dan navigated away from the video presentation 402 to carry on a private conversation in a private conversation area 404. When users navigate their image pointers near each other, they can hear each other and have a private conversation. Thus, Lori and Dan can communicate with each other, but Ann and Rob cannot hear or communicate with Lori and Dan and vice-versa. In some cases, Lori and Dan cannot hear the video presentation 402, while in other cases, Lori and Dan can still hear the video presentation 402 but not Anne and Rob.

FIG. 4A shows a new user, Tony, joining the meeting. Tony can navigate his image pointer 406 anywhere on the canvas 400 including the video presentation 402 or to the private conversation area 404. When Tony navigates the image pointer 406 over towards the video presentation 402 (e.g., within a predefined distance of the video presentation display element), Tony will end up viewing the video presentation 402.

FIG. 4B illustrates Tony attending the video presentation 402. In one embodiment, while attending the video presentation 402, the canvas 400 automatically zooms into the video presentation 402 thus causing the video presentation 402 to become in focus on the zoomable canvas 400. Alternative, a user attending the video presentation 402 can manually zoom into the video presentation 402 to view the content of the video presentation 402. Thus, the remainder of the canvas 400 including the private conversation area 404 disappears from view in FIG. 4B. The video presentation 402 is zoomed in and various display elements 408 shown. The video presentation 402 can also depicts an image pointer 410 of a presenter similar to that discussed in the embodiment of FIGS. 3A-3E. Consequently, the meeting shown in the embodiment of FIGS. 4A-4C can include a meeting/presentation similar to that discussed in connection with FIGS. 3A-3E. Additionally, Tony can zoom further into the presentation 402 and view just the presentation 402 on the entire canvas 400 (instead of viewing the presentation 402 along with image pointers for Anne and Rob).

At any time, Tony can zoom out of the video presentation 402 and return to a view similar to that of FIG. 4A. Tony can then navigate the image pointer 406 (e.g., pan over) to the private conversation area 404. In one embodiment, when Tony navigates the image pointer 406 to the private conversation area 404 (e.g., within a predefine distance of the private conversation area 404), the canvas 400 automatically zooms in to depict the private conversation area 404 larger as shown in FIG. 4C. Alternatively, Tony can manually zoom in to the private conversation area 404. In one embodiment, when a user in the private conversation area 404 zooms into the private conversation area 404, the audio from the video presentation may be muted by the display engine 122. Thus, the remainder of the canvas 400 including the video presentation 402 disappears from view as shown in FIG. 4C and the audio may be muted. In one embodiment, if the user (Tony) does not zoom into the private conversation area 404 while located at the private conversation area, the user can still hear (and possibly see in less detail) the video presentation 402. Once in the private conversation area 404 (e.g., within the predefine distance of the private conversation area 404), Lori, Dan, and Tony can carry on a conversation with their respective image pointers providing a live video feed of themselves.

It is noted that any of the users can break off from the video presentation 402 and/or the private conversation area 404 and create a second (or further) private conversation area. Further still, if other display elements are present on the zoomable canvas 400, the users can navigate their respective image pointer to the other display elements to view (or interact with) content from those display elements. Any number of private conversation areas, display elements, and presentations may be created/presented on the canvas 400 and any number of users can attend the meeting.

FIGS. 5A-5D illustrate a collaborative session using a zoomable canvas 500, according to some example embodiments. The collaborative session allows users in attendance to collaborate on a project (e.g., conduct a whiteboarding session, edit a document). Similar to the meeting embodiment discussed in FIGS. 4A- 4C, a user can move around the zoomable canvas 500 using their image pointer. In this case, the user can move between one or more collaborative projects or within a collaborative project. Each collaborative project comprises a group of users that can communicate with each other and edit the project (e.g., a document, a presentation, whiteboard). Since a collaborative session is essentially a meeting between users to discuss a collaborative project, the collaborative session can also be referred to as a meeting.

Figure 5A:
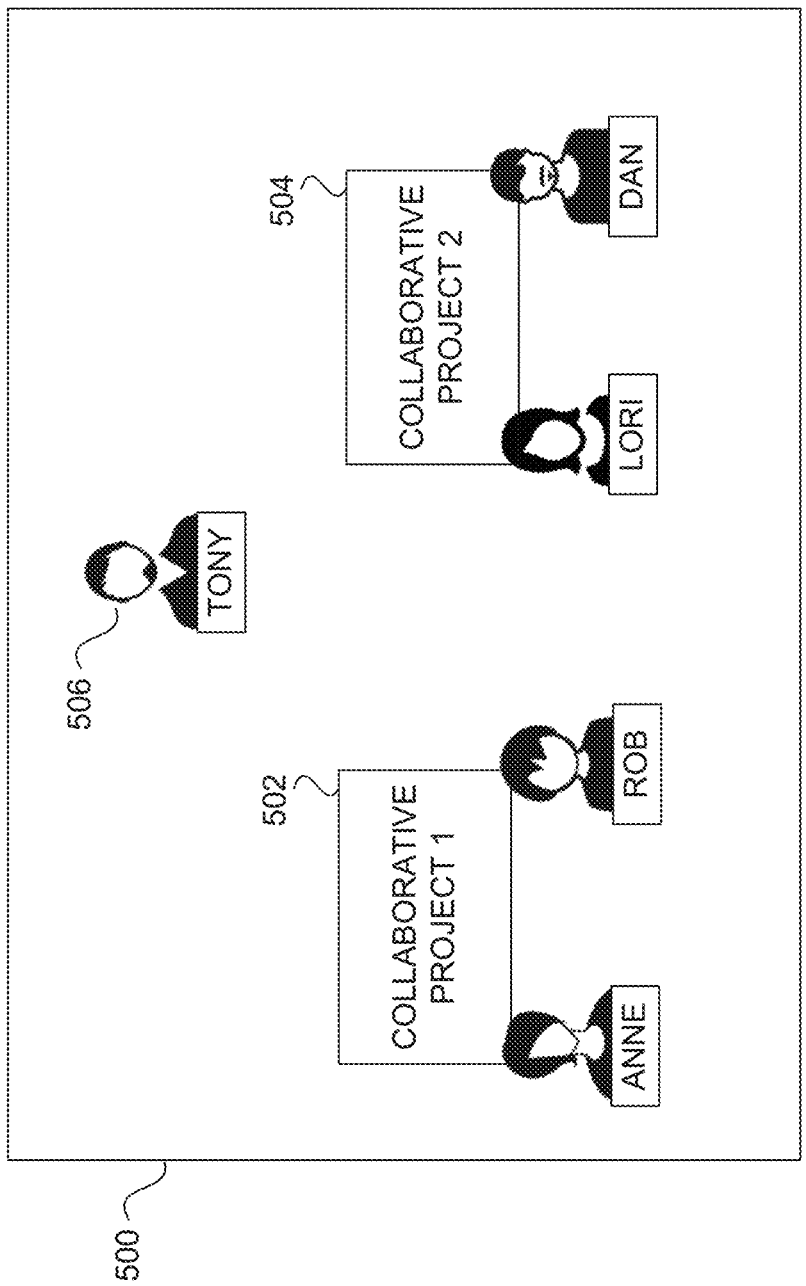
FIGS. 5A-5D illustrate a collaborative session using a zoomable canvas, according to some alternative example embodiments.

FIG. 5A shows a zoomable canvas 500 where two collaborative projects are occurring. As shown, Anne and Rob are working on a first collaborative project 502, while Lori and Dan are working on a second collaborative project 504. Any number of collaborative projects can be conducted at any time. Additionally, some embodiments may have a single collaborative project per collaborative session.

Figure 5B:
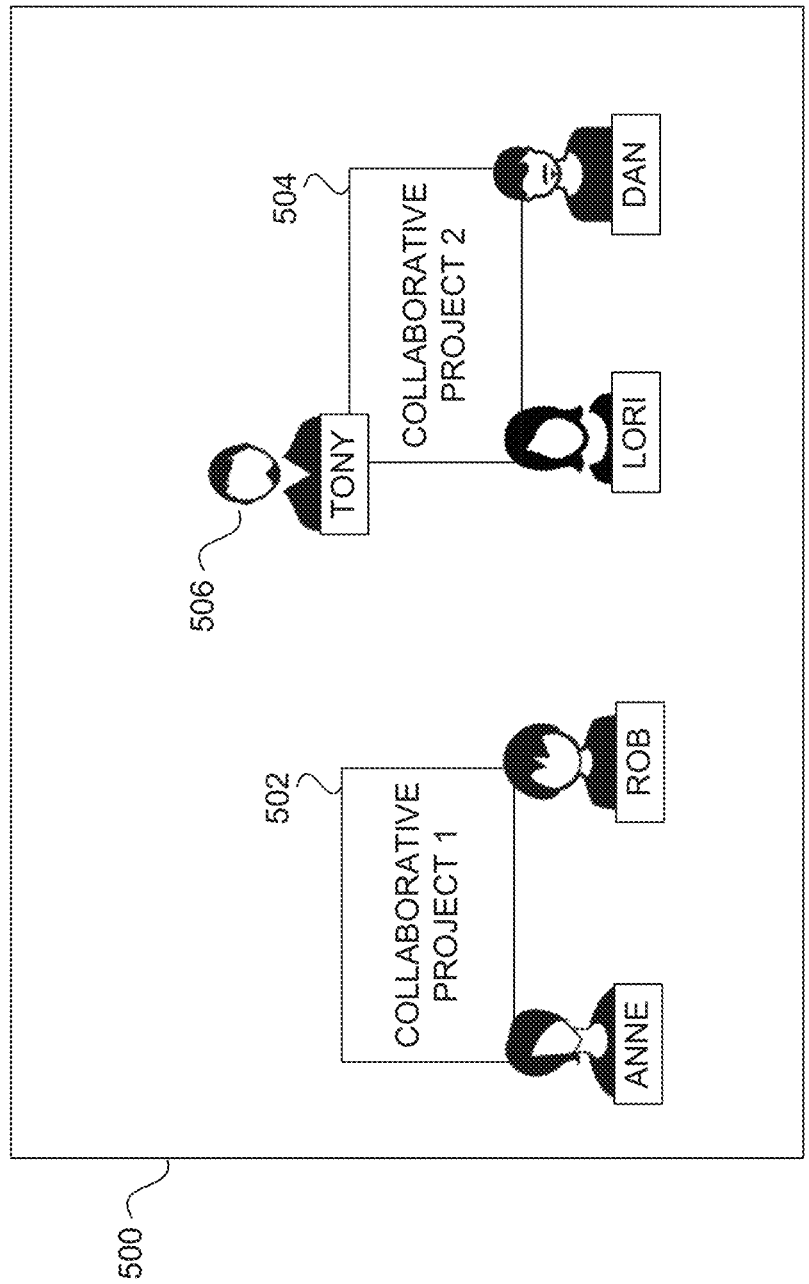

Tony has just joined the collaborative session in FIG. 5A. Here, Tony has a choice of navigating to the first collaborative project 502 or the second collaborative project 504 by moving an image pointer 506 having his live video (feed) image to one of the collaborative projects. As shown in FIG. 5B, Tony moves the image pointer 506 to the second collaborative project 504 (e.g., within a predefine distance of the second collaborative project 504). By moving the image pointer 506 to an area of the second collaborative project 504, Tony can communicate with other users in the same area—here Lori and Dan. This is similar to the private conversation area 404 in the meeting embodiment. Here, Lori, Dan, and Tony can carry on a conversation with their respective image pointers providing a live video feed of themselves.

Figure 5C:
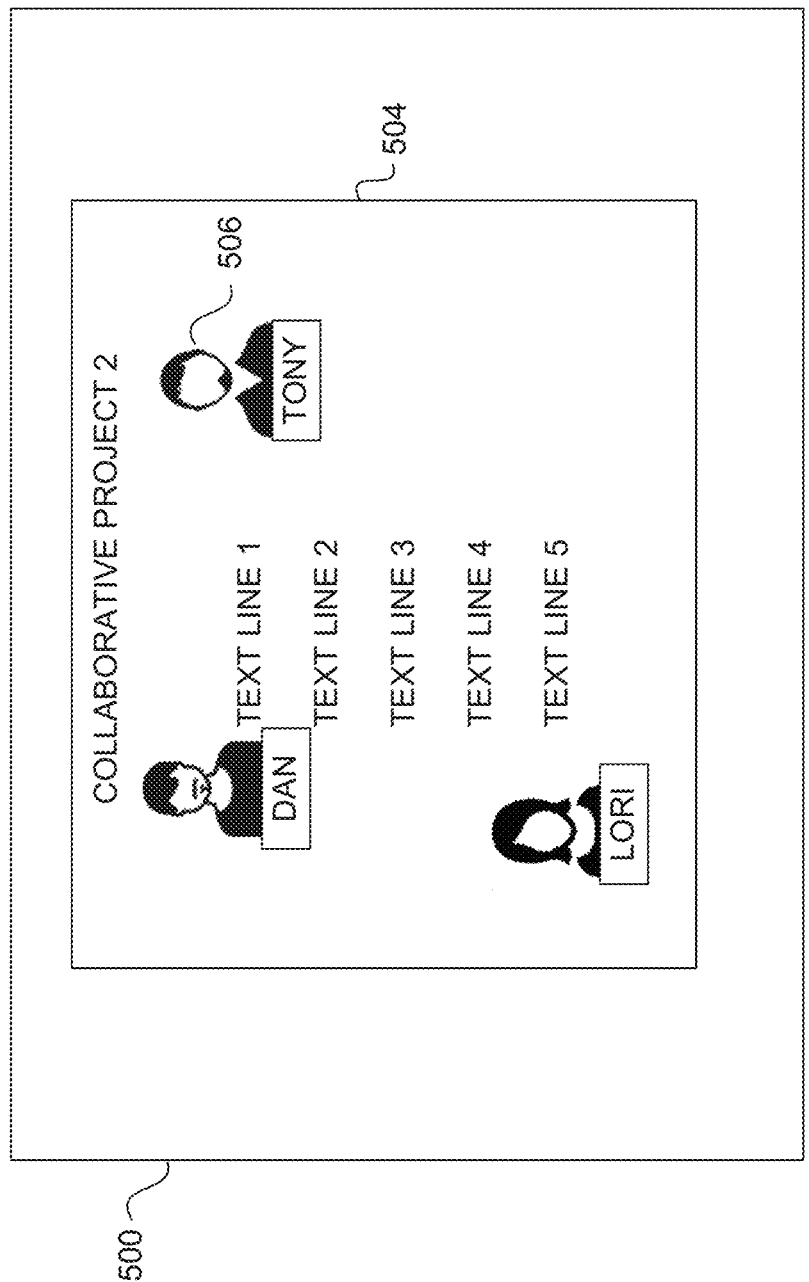
Figure 5D:
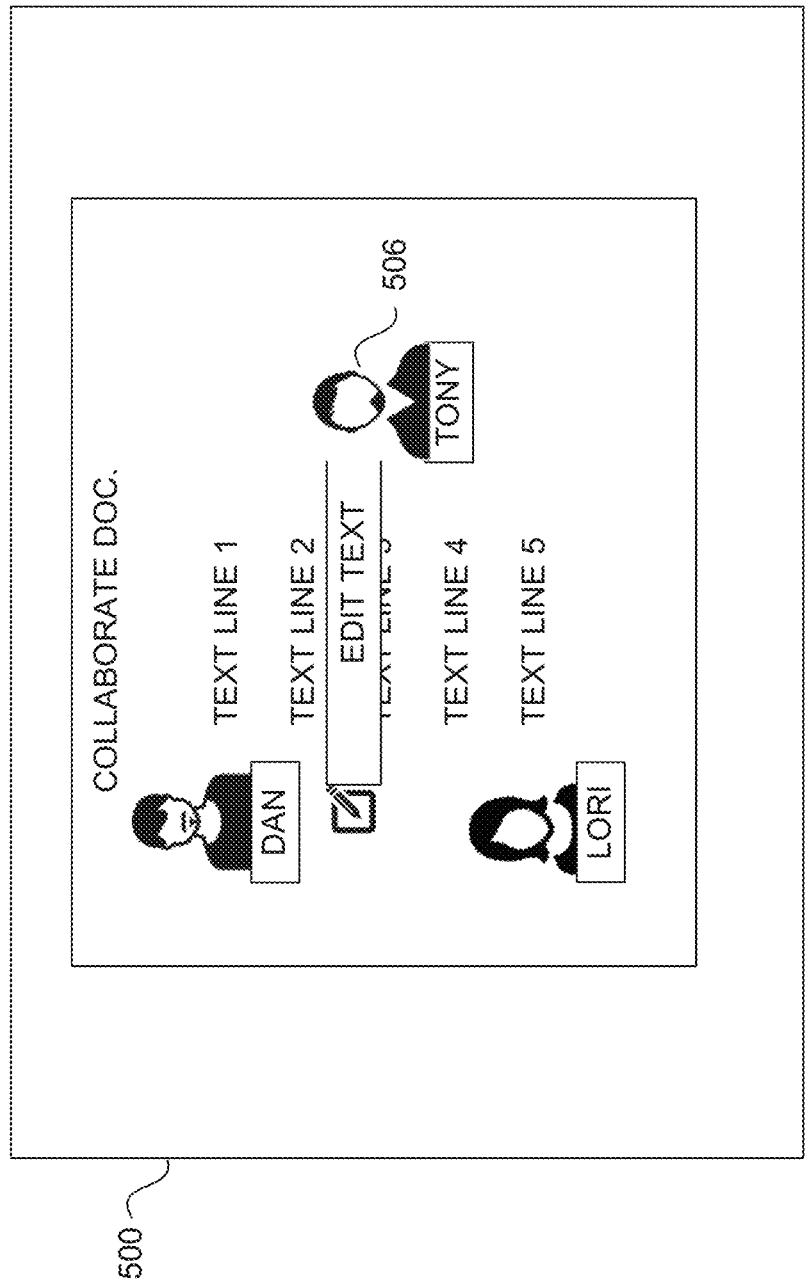

Tony can zoom into the canvas 500 to view the second collaborative project 504 as shown in FIG. 5C. Once zoomed in, Tony can view and edit content within the second collaborative project 504, as well as discuss the content with the other users in the second collaborative project 504. For example, Tony can navigate the image pointer 506 to a line of text in the second collaborative project 504. Tony can then select an option to edit the line of text (e.g., text line 3) as shown in FIG. 5D. While the second collaborative project 504 shows only text, alternative collaborative projects can comprise any content (or combination of content) including text, images, video, and audio, which can be viewed, edited, added to, or deleted from the collaborative project. Within the zoomed-in collaborative project 504, Lori, Dan, and Tony can continue to carry on a conversation with their respective image pointers providing a live video feed of themselves as they navigate around the collaborative project 504 to point at or edit various elements within the collaborative project 504.

While the embodiment of FIGS. 5A-5D discusses a pure collaborative session, further embodiments can combine, in various combinations, the embodiments of FIGS. 3A-3E (e.g., live presentation), FIGS. 4A-4C (e.g., meeting with private conversation areas), and FIGS. 5A-FIG. 5D (e.g., collaborative session with projects). For example, a zoomable canvas can combine a live presentation with one or more collaborative projects, combine a collaborative session with private conversation areas, or combine a live presentation with a meeting having private conversation areas, and one or more collaborative projects—all enabling the use of image pointers having live audio/video feeds of the users.

Figure 6:
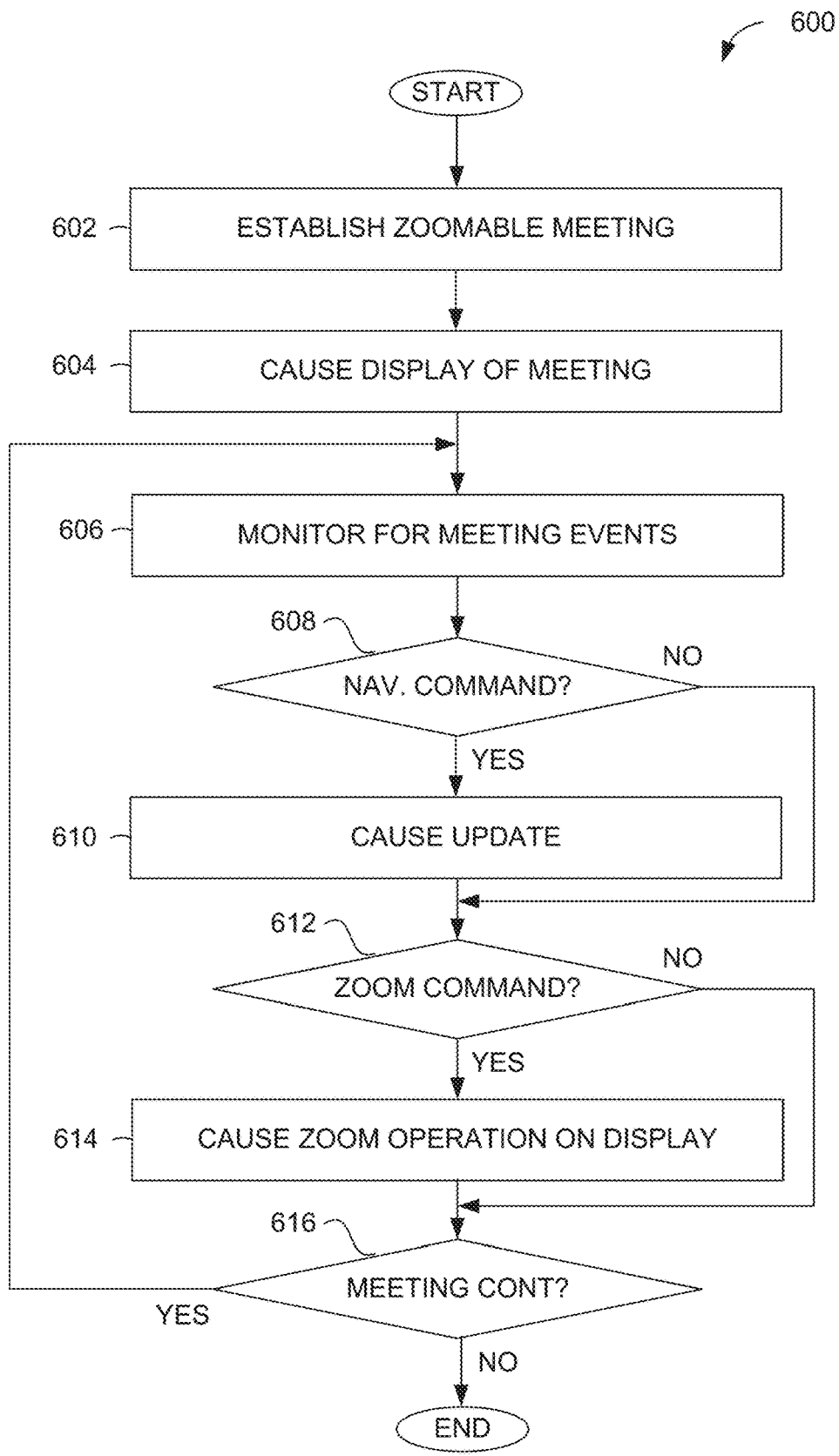
FIG. 6 is a flowchart illustrating operations of a method for managing and conducting a meeting using a zoomable canvas and one or more image pointers, according to some example embodiments.

FIG. 6 is a flowchart illustrating operations of a method 600 for managing and conducting a meeting using a zoomable canvas and one or more image pointers, according to some example embodiments. Operations in the method 600 may be performed by the video management system 106 in connection with the user devices 102 (e.g., running a corresponding application). Accordingly, the method 600 is described by way of example with reference to the video management system 106 and the user devices 102. However, it shall be appreciated that at least some of the operations of the method 600 may be deployed on various other hardware configurations or be performed by similar components residing elsewhere in the network environment 100.

In operation 602, the video management system 106 (e.g., the meeting engine 120) establishes a zoomable meeting. In example embodiments, the zoomable meeting is established by communicatively coupling two or more user devices 102 over the network 104 to allow the users of those user devices 102 to present or view the meeting. The video management system 106 also receives live video feeds from one or more of the user devices 102. These live video feeds may be used to create a corresponding image pointer that is used to navigate around the zoomable meeting. Further still, the video management system 106 may receive data to be displayed on the canvas such as a presentation, display element, or document.

In operation 604, the video management system 106 (e.g., the display engine 122) causes display of the zoomable meeting on the user devices 102 of users attending the meeting. In example embodiments, the video management system 106 creates a zoomable meeting on a zoomable canvas by displaying one or more display elements on the zoomable canvas. The zoomable meeting allows a plurality of users to view a meeting presentation and establish private conversations between themselves by navigating their image pointers around on the canvas. By navigating around, the users can communicate with other users that have positioned their image pointers in proximity with each other. At any given time, only a portion of the canvas is visible on the user device 102.

In operation 606, the video management system 106 (e.g., the monitoring module 124) monitors for meeting events. The meeting events can comprise, for example, movement of image pointers, sharing of information (e.g., sharing screens), and zoom-in and zoom-out operations.

In operation 608, a determination is made whether an image pointer navigation command is received from one of the users by the monitoring module 124. While viewing the canvas through the viewing window, users can pan across the canvas in two dimensions by moving their respective image pointer having their live video image around the canvas. The image pointer can be moved, for example, by using a cursor input control (e.g., a mouse) or by a gesture performed by the user in embodiments where the camera (e.g., camera 110) includes a gesture sensor.

If a navigation command is received in operation 608, then the canvas is updated by the display engine 122 to show the movement of the image pointer on the display in operation 610. In embodiments where the user that is navigating their image pointer is a presenter, the image pointer of the presenter is moved on a display of the user devices of all the viewers. This allows the presenter to "point" to display elements (or portion of a display element) on the canvas using their image pointer as the presenter is discussing that display element (or portion of the display element).

In embodiments where the navigation command results in the image pointer moving into a predefined distance of a presentation or private conversation area, the user may be taken into the respective canvas space by the display engine 122. For example, the user may be zoomed into the presentation to view its content. Alternatively, the user may enter into a private conversation with other users having image pointers located in the same private conversation area.

In operation 612, a determination is made, by the monitoring module 124, whether a zoom command is received. While viewing the canvas through the viewing window, users can zoom into objects of interest (e.g., zoom into a display element) or zoom out of an object. For example, as the user zooms into a text object it may be represented as a small dot, then a thumbnail of a page of text, then a full-sized page, and finally a magnified view of the page.

If in operation 612 a zoom command is received, then in operation 614, a zoom operation is performed and displayed on the canvas by the display engine 122. In embodiments where the user performing the zooming is the presenter, the zoom operation is displayed on the canvas displayed on the user devices of all the viewers. Thus, the presenter can zoom into a portion of a display element to show further details of the display element to the viewers. The presenter can also zoom out to show less of the display element and more of the canvas. In embodiments where the user performing the zooming is a viewer of the meeting, the zoom operation may be displayed only on the user device of that particular user. With each zoom operation, other image pointers may be visible (e.g., zooming into a display element with other users already zoomed into the same display element; zooming out a display element into a portion of the canvas with other user image pointers) or may be removed from view (e.g., zooming into a display element where previously viewable image pointers are not zoomed into).

In operation 616, a determination is made (e.g., by the meeting engine 120) whether the meeting is continuing or has ended. If the meeting continues, then the method 600 returns to operation 606 where the video management system 106 continues to monitor for meeting events.

Figure 7:
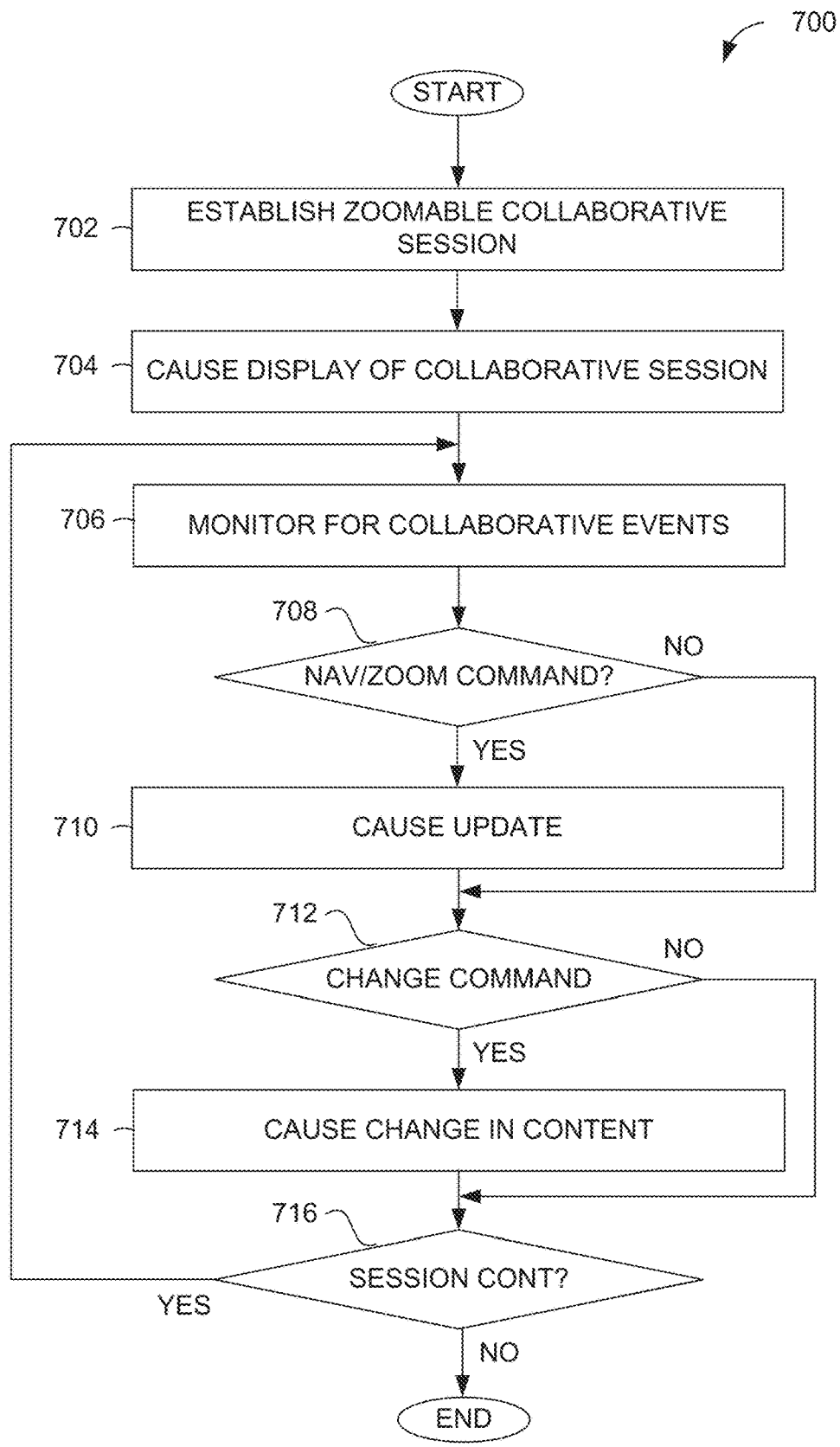
FIG. 7 is a flowchart illustrating operations of a method for managing and conducting a collaborative session using a zoomable canvas and one or more image pointers, according to some example embodiments.

FIG. 7 is a flowchart illustrating operations of a method 700 for managing and conducting a collaborative session using a zoomable canvas and one or more image pointers, according to some example embodiments. Operations in the method 700 may be performed by the video management system 106 in connection with the user devices 102 (e.g., running a corresponding application). Accordingly, the method 700 is described by way of example with reference to the video management system 106 and the user devices 102. However, it shall be appreciated that at least some of the operations of the method 700 may be deployed on various other hardware configurations or be performed by similar components residing elsewhere in the network environment 100.

In operation 702, the video management system 106 (e.g., the meeting engine 120) establishes a zoomable collaborative session. In example embodiments, the zoomable collaborative session is established by communicatively coupling two or more user devices 102 over the network 104 to allow the users of those user devices 102 to collaborate on a project. The video management system 106 also receives live video feeds from one or more of the user devices 102. These live video feeds may be used to create a corresponding image pointer that is used to navigate around the zoomable collaborative session. Further still, the video management system 106 may receive data to be displayed on the canvas such as a document or display elements (e.g., text, images) of a collaborative session (e.g., whiteboarding session).

In operation 704, the video management system 106 (e.g., the display engine 122) causes display of the zoomable collaborative session on the user devices 102 of users that are collaborating on one or more projects. In example embodiments, the video management system 106 creates a zoomable collaborative session on a zoomable canvas that is displayed on the user devices 102 in the collaborative session. The zoomable collaborative session allows a plurality of users to collaborate on a project and between projects by navigating their image pointers around on the canvas. By navigating around, the users can communicate with other users that are located within a private conversation area associated with a collaborative project or created between users that have positioned their image pointers in proximity with each other. In some embodiments, only a portion of the canvas is visible on the user device 102 of these users through a window.

In operation 706, the video management system 106 (e.g., the monitoring module 124) monitors for collaborative events. The collaborative events can comprise, for example, movement of image pointers, zoom-in and zoom-out operations, and changes made to a collaborative project.

In operation 708, a determination is made, by the monitoring module 124, whether an image pointer navigation command or zoom command is received from one of the users. While viewing the canvas through the viewing window, users can pan across the canvas in two dimensions by moving their respective image pointer with their live video image around the canvas. The user can also zoom into or out of a display element to view more details or less details, respectively.

If a navigation command or zoom command is received in operation 708, then the canvas is updated, by the display engine 122, to show the movement of the image pointer on the display or the zoom operation in operation 710. In some cases, the movement may be shown on the display of the user that is moving their image pointer. Users that are zoomed into a collaborative project may not see the movement of another user moving their image pointer if the user is moving the pointer away from that collaborative project or is located outside of the zoomed-in collaborative project. In embodiments, where the navigation command results in the image pointer moving into a predefined distance of a private conversation area or collaborative project, the user is taken into the respective canvas space by the display engine 122. For example, the user may enter into a private conversation with other users having image pointers located in the same private conversation area. Further still, the user may be able to carry on a conversation with user in the same collaborative project and/or be automatically zoomed into the content within the collaborative project (e.g., when there is only one project in the collaborative session).

In embodiments where the user is manually zooming into a collaborative project, the canvas on the user's user device will show the zooming into the collaborative project. Additionally, any users that are already in that collaborative project will see the user enter the collaborative project. By navigating to and/or entering the collaborative project, the user can communicate with the other users associated with (e.g., image pointer located within a predefined area of the collaborative project) the collaborative project. The user can also zoom out of the collaborative project and navigate to a different collaborative project.

In some embodiments, only a single collaborative project is associated with the collaborative session. In these embodiments, the users may automatically be zoomed into the content of the collaborative project upon joining the collaborative session. The users can still move their image pointer around the collaborative project to view and discuss various content in the collaborative project.

In operation 712, a determination is made, by the monitoring module 124, whether a content change command is received. The content change command comprises instructions to make a change to content of the collaborative session that users are zoomed into. The change can include one or more of editing content, adding content, deleting content, moving content around, and so forth. The content can be one or more of, for example, text, images, video, and audio. In various embodiments, the user navigates their image pointer to an area of the content where the user wants to make the change. The user can then provide an input to trigger the change.

In some cases, there may be no change commands during a collaborative session. For example, a set of users may want to collectively review and discuss a document or presentation in the collaborative session or provide verbal feedback.

If a change command is received in operation 712, then the content is changed in operation 714 by the display engine 122. In these embodiments, the video management system 106 updates the content, and the change to the content is displayed (e.g., in real-time) on the canvases of the users in the collaborative project. The change to the content may also be stored to a storage device (e.g., storage device 126).

In operation 716, a determination is made, by the meeting engine 120, whether the collaborative session is continuing or has ended. If the collaborative session continues, then the method 700 returns to operation 706 where the video management system 106 continues to monitor for collaborative events.

Figure 8:
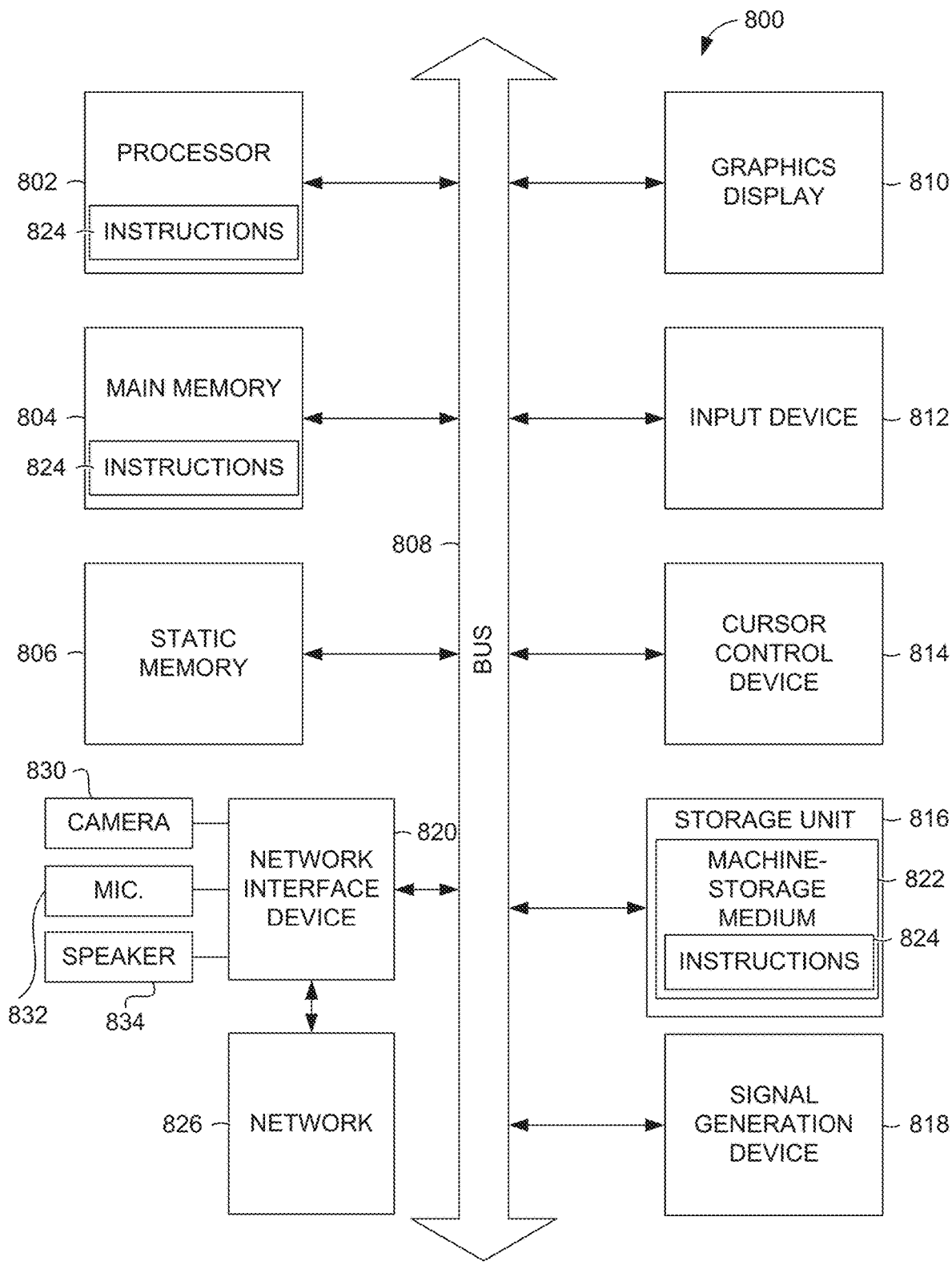
FIG. 8 is a block diagram illustrating components of a machine, according to some example embodiments, able to read instructions from a machine-storage medium and perform any one or more of the methodologies discussed herein.

FIG. 8 illustrates components of a machine 800, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 8 shows a diagrammatic representation of the machine 800 in the example form of a computer device (e.g., a computer) and within which instructions 824 (e.g., software, a program, an application, an applet, an app, or other executable code) for causing the machine 800 to perform any one or more of the methodologies discussed herein may be executed, in whole or in part.

For example, the instructions 824 may cause the machine 800 to execute the flow diagrams of FIGS. 6 and 7. In one embodiment, the instructions 824 can transform the general, non-programmed machine 800 into a particular machine (e.g., specially configured machine) programmed to carry out the described and illustrated functions in the manner described.

In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a peer-to-peer (or distributed) network environment. The machine 800 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 824 (sequentially or otherwise) that specify actions to be taken by that machine. Further, while only a single machine is illustrated, the term "machine" shall also be taken to include a collection of machines that individually or jointly execute the instructions 824 to perform any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, or a cathode ray tube (CRT), or any other display capable of displaying graphics or video). The machine 800 may also include an input device 812 (e.g., a keyboard), a cursor control device 814 (e.g., a mouse, a touchpad, a trackball, a joystick, a motion sensor, or other pointing instrument), a storage unit 816, a signal generation device 818 (e.g., a sound card, an amplifier, a speaker, a headphone jack, or any suitable combination thereof), and a network interface device 820.

The storage unit 816 includes a machine-storage medium 822 (e.g., a tangible machine-storage medium) on which is stored the instructions 824 (e.g., software) embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered as machine-storage media (e.g., tangible and non-transitory machine-storage media). The instructions 824 may be transmitted or received over a network 826 via the network interface device 820.

In some example embodiments, the machine 800 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (i.e., 804, 806, and/or memory of the processor(s) 802) and/or storage unit 816 may store one or more sets of instructions and data structures (e.g., software) 824 embodying or utilized by any one or more of the methodologies or functions described herein. These instructions, when executed by processor(s) 802 cause various operations to implement the disclosed embodiments.

As used herein, the terms "machine-storage medium," "device-storage medium," "computer-storage medium" (referred to collectively as "machine-storage medium 822") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 822 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 822 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 824 may further be transmitted or received over a communications network 826 using a transmission medium via the network interface device 820 and utilizing any one of a number of well-known transfer protocols (e.g., HTTP). Examples of communication networks 826 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 824 for execution by the machine 800, and includes digital or analog communications signals or other intangible medium to facilitate communication of such software.

In some embodiments, the network interface device 820 comprises a data interface device that is coupled to one or more of a camera 830, a microphone 832, and/or a speaker 834, which may be external to the machine 800. The camera 830 may include a sensor (not shown) configured for facial detection and gesture detection. Any of the camera 830, microphone 832, and speaker 834 may be used to conduct the all meeting or collaborative project as discussed herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g. an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

EXAMPLES

Example 1 is a method for providing a zoomable meeting and collaborative canvas with image pointers. The method comprises establishing, by a video management system, a zoomable meeting, the establishing the zoomable meeting comprising communicatively coupling a plurality of user devices over a communications network; receiving a live audio/video feed from one or more users of the plurality of user devices; causing display of the zoomable meeting on a display of each of the plurality of user devices, the causing display comprising causing display of a zoomable canvas that enables movement of one or more image pointers that each show the live audio-video feed of one of the one or more users; monitoring, by a hardware processor of the video management system, for an image pointer operation for an image pointer of the one or more image pointers, the image pointer operation comprising at least one of a navigation command or a zoom command; and based on the image pointer operation, causing an update to the zoomable canvas to display performance of the image pointer operation.

In example 2, the subject matter of example 1 can optionally include wherein the zoomable meeting comprises a live presentation and one or more private conversation areas, each private conversation area configured to allow users having respective image pointers located in the private conversation area to communicate exclusively with each other.

In example 3, the subject matter of any of examples 1-2 can optionally include wherein the zoomable meeting comprises a collaborative session that communicatively couples the plurality of user devices to enable users to collaborate on one or more collaborative projects.

In example 4, the subject matter of any of examples 1-3 can optionally include wherein the navigation command comprises movement of the image pointer showing the live audio/video feed to a different location on the zoomable canvas.

In example 5, the subject matter of any of examples 1-4 can optionally include wherein the different location comprises a private conversation area on the zoomable canvas, the private conversation area configured to allow users having respective image pointers located in the private conversation area to communicate exclusively with each other.

In example 6, the subject matter of any of examples 1-5 can optionally include wherein the different location comprises a portion of a collaborative project, the user being enabled to point to or edit the portion of the collaborative project via their image pointer.

In example 7, the subject matter of any of examples 1-6 can optionally include wherein the different location comprises a presentation within the zoomable meeting; and the causing the update to the zoomable canvas comprises causing the presentation to become in focus on the zoomable canvas.

In example 8, the subject matter of any of examples 1-7 can optionally include wherein the image pointer further comprises a ring and elastic arm; and the movement comprises dragging the image pointer via the ring, the dragging causing the elastic arm to stretch on the zoomable canvas.

In example 9, the subject matter of any of examples 1-8 can optionally include wherein the zoom command comprises a zoom into a display element on the zoomable canvas; and the causing the update to the zoomable canvas comprises showing the image pointer in a zoomed-in view on the zoomable canvas, the zoomed-in view displaying more details of the display element.

Example 10 is a system for providing a zoomable meeting and collaborative canvas with image pointers. The system includes one or more processors and a memory storing instructions that, when executed by the one or more hardware processors, causes the one or more hardware processors to perform operations comprising establishing a zoomable meeting, the establishing the zoomable meeting comprising communicatively coupling a plurality of user devices over a communications network; receiving a live audio/video feed from one or more users of the plurality of user devices; causing display of the zoomable meeting on a display of each of the plurality of user devices, the causing display comprising causing display of a zoomable canvas that enables movement of one or more image pointers that each show the live audio-video feed of one of the one or more users; monitoring for an image pointer operation for an image pointer of the one or more image pointers, the image pointer operation comprising at least one of a navigation command or a zoom command; and based on the image pointer operation, causing an update to the zoom able canvas to display performance of the image pointer operation.

In example 11, the subject matter of example 10 can optionally include wherein the zoomable meeting comprises a live presentation and one or more private conversation areas, each private conversation area configured to allow users having respective image pointers located in the private conversation area to communicate exclusively with each other.

In example 12, the subject matter of any of examples 10-11 can optionally include wherein the zoomable meeting comprises a collaborative session that communicatively couples the plurality of user devices to enable users to collaborate on one or more collaborative projects.

In example 13, the subject matter of any of examples 10-12 can optionally include wherein the navigation command comprises movement of the image pointer showing the live audio/video feed to a different location on the zoomable canvas.

In example 14, the subject matter of any of examples 10-13 can optionally include wherein the different location comprises a private conversation area on the zoomable canvas, the private conversation area configured to allow users having respective image pointers located in the private conversation area to communicate exclusively with each other.

In example 15, the subject matter of any of examples 10-14 can optionally include wherein the different location comprises a portion of a collaborative project, the user being enabled to point to or edit the portion of the collaborative project via their image pointer.

In example 16, the subject matter of any of examples 10-15 can optionally include wherein the different location comprises a presentation within the zoomable meeting; and the causing the update to the zoomable canvas comprises causing the presentation to become in focus on the zoomable canvas.

In example 17, the subject matter of any of examples 10-16 can optionally include wherein the image pointer further comprises a ring and elastic arm; and the movement comprises dragging the image pointer via the ring, the dragging causing the elastic art to stretch on the zoomable canvas.

In example 18, the subject matter of any of examples 10-17 can optionally include wherein the zoom command comprises a zoom into a display element on the zoomable canvas; and the causing the update to the zoomable canvas comprises showing the image pointer in a zoomed-in view on the zoomable canvas, the zoomed-in view displaying more details of the display element.

Example 19 is a machine-storage medium storing instructions for providing a zoomable meeting and collaborative canvas with image pointers. The instructions configures one or more processors to perform operations comprising establishing a zoomable meeting, the establishing the zoomable meeting comprising communicatively coupling a plurality of user devices over a communications network; receiving a live audio/video feed from one or more users of the plurality of user devices; causing display of the zoomable meeting on a display of each of the plurality of user devices, the causing display comprising causing display of a zoomable canvas that enables movement of one or more image pointers that each show the live audio-video feed of one of the one or more users; monitoring for an image pointer operation for an image pointer of the one or more image pointers, the image pointer operation comprising at least one of a navigation command or a zoom command; and based on the image pointer operation, causing an update to the zoomable canvas to display performance of the image pointer operation.

In example 20, the subject matter of example 19 can optionally include wherein the navigation command comprises movement of the image pointer showing the live audio/video feed to a different location on the zoomable canvas.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    establishing, by a video management system, a zoomable meeting, the establishing the zoomable meeting comprising communicatively coupling a plurality of user devices over a communications network;
    receiving a live audio/video feed from one or more users of the plurality of user devices;
    causing display of the zoomable meeting on a display of each of the plurality of user devices, the causing display comprising causing display of a portion of a zoomable canvas through a viewing window on each of the plurality of user devices, the zoomable canvas enabling movement of one or more image pointers that each show the live audio-video feed of one of the one or more users in an image portion of an image pointer, a further portion of the zoomable canvas becoming visible through the viewing window by panning across the zoomable canvas based on movement of an image pointer, the zoomable canvas comprising a plurality of display elements, each display element being individually zoomable into using the image pointer and at least one display element having one or more further nested display elements that can each be further zoomed in;
    monitoring, by a hardware processor of the video management system, for an image pointer operation of the image pointer of the one or more image pointers, the image pointer operation comprising at least one of a navigation command that moves the image pointer from one location to another or a zoom command that zooms the image pointer into or out of the zoomable canvas, movement of the image pointer causing display of dynamically radiating elements about the image portion that indicate the movement of the image pointer; and
    based on the image pointer operation, causing an update to the zoomable canvas to display performance of the image pointer operation.

2. The method of claim 1, wherein:
    the zoomable meeting comprises a live presentation and one or more private conversation areas, each private conversation area configured to allow users having respective image pointers located in the private conversation area to communicate exclusively with each other; and
    the navigation command comprises a movement of the image pointer from the live presentation to the private conversation area or a movement of the image pointer from the private conversation area to the live presentation.

3. The method of claim 1, wherein the zoomable meeting comprises a collaborative session that communicatively couples the plurality of user devices to enable users to collaborate on one or more collaborative projects.

4. The method of claim 1, wherein the image pointer operation is based on one or more user gestures detected by a gesture sensor of a camera.

5. The method of claim 1, wherein:
    the navigation command comprises a movement of the image pointer to a private conversation area on the zoomable canvas, the private conversation area configured to allow users having respective image pointers located in the private conversation area to communicate exclusively with each other; and
    the causing the update to the zoomable canvas comprises automatically causing the zoomable canvas to zoom in to depict the private conversation area in response to the navigation of the image pointer to the private conversation area, the zoom in causing muting of any audio from outside of the private conversation area.

6. The method of claim 1, wherein the navigation command comprises a movement of the image pointer to a portion of a collaborative project, a user associated with the image pointer being enabled to point to or edit the portion of the collaborative project via their image pointer.

7. The method of claim 1, wherein:
    the navigation command comprises a movement of the image pointer to a video presentation occurring within the zoomable meeting, the video presentation comprising a portion of attendees of the zoomable meeting; and the causing the update to the zoomable canvas comprises causing the zoomable canvas to zoom into the video presentation and cause the video presentation to become in focus in the viewing window by displaying the video presentation and image pointers of any other attendees of the video presentation and removing image pointers of attendees of the zoomable meeting not in the video presentation.

8. The method of claim 1, wherein:
the image pointer comprises the image portion that displays the live audio-video feed and an elastic arm coupled to the image portion at a first end and coupled to a ring at a second end; and
the movement comprises dragging the ring to move the image pointer, the dragging causing the elastic arm to stretch as a user accelerates moving the ring on the zoomable canvas.

9. The method of claim 1, wherein:
the zoom command comprises a zoom into a display element of the plurality of display elements on the zoomable canvas; and
the causing the update to the zoomable canvas comprises showing the image pointer in a zoomed-in view on the zoomable canvas, the zoomed-in view displaying more details of the display element including one or more nested zoomable display elements grouped within a frame associated with the display element.

10. The method of claim 1, wherein:
the image pointer operation is associated with an image pointer of a presenter in the zoomable meeting; and
the causing display of the zoomable meeting comprises causing display, to other users in the zoomable meeting, of the portion of the zoomable canvas based on the image pointer operation of the image pointer of the presenter, the causing presentation including causing display of the live audio-video feed of the presenter within the image pointer as the image pointer pans around and zooms into and out of the zoomable canvas.

11. A system comprising:
one or more hardware processors; and
a memory storing instructions that, when executed by the one or more hardware processors, cause the one or more hardware processors to perform operations comprising:
  establishing a zoomable meeting, the establishing the zoomable meeting comprising communicatively coupling a plurality of user devices over a communications network;
  receiving a live audio/video feed from one or more users of the plurality of user devices;
  causing display of the zoomable meeting on a display of each of the plurality of user devices, the causing display comprising causing display of a portion of a zoomable canvas through a viewing window on each of the plurality of user devices, the zoomable canvas enabling movement of one or more image pointers that each show the live audio-video feed of one of the one or more users in an image portion of an image pointer, a further portion of the zoomable canvas becoming visible through the viewing window by panning across the zoomable canvas based on movement of an image pointer, the zoomable canvas comprising a plurality of display elements, each display element being individually zoomable into using the image pointer and at least one display element having one or more further nested display elements that can each be further zoomed in;
  monitoring for an image pointer operation of the image pointer of the one or more image pointers, the image pointer operation comprising at least one of a navigation command that moves the image pointer from one location to another or a zoom command that zooms the image pointer into or out of the zoomable canvas, movement of the image pointer causing display of dynamically radiating elements about the image portion that indicate the movement of the image pointer; and
  based on the image pointer operation, causing an update to the zoomable canvas to display performance of the image pointer operation.

12. The system of claim 11, wherein:
the zoomable meeting comprises a live presentation and one or more private conversation areas, each private conversation area configured to allow users having respective image pointers located in the private conversation area to communicate exclusively with each other; and
the navigation command comprises a movement of the image pointer from the live presentation to the private conversation area or a movement of the image pointer from the private conversation area to the live presentation.

13. The system of claim 11, wherein the zoomable meeting comprises a collaborative session that communicatively couples the plurality of user devices to enable users to collaborate on one or more collaborative projects.

14. The system of claim 11, wherein the image pointer operation is based on one or more user gestures detected by a gesture sensor of a camera.

15. The system of claim 11, wherein:
the navigation command comprises a movement of the image pointer to a private conversation area on the zoomable canvas, the private conversation area configured to allow users having respective image pointers located in the private conversation area to communicate exclusively with each other and
the causing the update to the zoomable canvas comprises automatically causing the zoomable canvas to zoom in to depict the private conversation area in response to the navigation of the image pointer to the private conversation area, the zoom in causing muting of any audio from outside of the private conversation area.

16. The system of claim 11, wherein the navigation command comprises a movement of the image pointer to a portion of a collaborative project, a user associated with the image pointer being enabled to point to or edit the portion of the collaborative project via their image pointer.

17. The system of claim 11, wherein:
the navigation command comprises a movement of the image pointer to a video presentation occurring within the zoomable meeting, the video presentation comprising a portion of attendees of the zoomable meeting; and
the causing the update to the zoomable canvas comprises causing the zoomable canvas to zoom into the video presentation and cause the video presentation to become in focus in the viewing window by displaying the video presentation and image pointers of any other attendees of the video presentation and removing image pointers of attendees of the zoomable meeting not in the video presentation.

18. The system of claim 11, wherein:
the image pointer comprises the image portion that displays the live audio-video feed and an elastic arm coupled to the image portion at a first end and coupled to a ring at a second end; and the movement comprises dragging the ring to move the image pointer, the dragging causing the elastic arm to stretch as a user accelerates moving the ring on the zoomable canvas.

19. The system of claim 11, wherein:

the zoom command comprises a zoom into a display element of the plurality of display elements on the zoomable canvas; and the causing the update to the zoomable canvas comprises showing the image pointer in a zoomed-in view on the zoomable canvas, the zoomed-in view displaying more details of the display element including one or more nested zoomable display elements grouped within a frame associated with the display element.

20. A machine-storage medium storing instructions that, when executed by one or more processors of a machine, cause the machine to perform operations comprising:

establishing a zoomable meeting, the establishing the zoomable meeting comprising communicatively coupling a plurality of user devices over a communications network;

receiving a live audio/video feed from one or more users of the plurality of user devices;

causing display of the zoomable meeting on a display of each of the plurality of user devices, the causing display comprising causing display of a portion of a zoomable canvas through a viewing window on each of the plurality of user devices, the zoomable canvas enabling movement of one or more image pointers that each show the live audio-video feed of one of the one or more users in an image portion of an image pointer, a further portion of the zoomable canvas becoming visible through the viewing window by panning across the zoomable canvas based on movement of an image pointer, the zoomable canvas comprising a plurality of display elements, each display element being individually zoomable into using the image pointer and at least one display element having one or more further nested display elements that can each be further zoomed in;

monitoring for an image pointer operation of an image pointer of the one or more image pointers, the image pointer operation comprising at least one of a navigation command that moves the image pointer from one location to another or a zoom command that zooms the image pointer into or out of the zoomable canvas, movement of the image pointer causing display of dynamically radiating elements about the image portion that indicate the movement of the image pointer; and based on the image pointer operation, causing an update to the zoomable canvas to display performance of the image pointer operation.

* * * * *

UNITED STATES PATENT AND TRADEMARK OFFICE
CERTIFICATE OF CORRECTION

| | | |
|---|---|---|
| PATENT NO. | : 11,893,541 B2 | Page 1 of 1 |
| APPLICATION NO. | : 17/501659 | |
| DATED | : February 6, 2024 | |
| INVENTOR(S) | : Somlai-Fischer et al. | |

It is certified that error appears in the above-identified patent and that said Letters Patent is hereby corrected as shown below:

In the Claims

In Column 24, Line 40, in Claim 15, after "other", insert --;--

Signed and Sealed this
Twenty-sixth Day of March, 2024

*Katherine Kelly Vidal*

Katherine Kelly Vidal
*Director of the United States Patent and Trademark Office*